US007613721B2

(12) United States Patent
Horvitz et al.

(10) Patent No.: US 7,613,721 B2
(45) Date of Patent: Nov. 3, 2009

(54) SCHEMAS FOR A NOTIFICATION PLATFORM AND RELATED INFORMATION SERVICES

(75) Inventors: Eric J. Horvitz, Kirkland, WA (US); Paul A. Steckler, Redmond, WA (US); Shaun D. Pierce, Sammamish, WA (US); Lijiang Fang, Sammamish, WA (US); Mark H. Lucovsky, Sammamish, WA (US); Winnie C. Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 11/203,484

(22) Filed: Aug. 12, 2005

(65) Prior Publication Data

US 2005/0278366 A1 Dec. 15, 2005

Related U.S. Application Data

(60) Division of application No. 10/099,467, filed on Mar. 14, 2002, now Pat. No. 6,980,993, which is a continuation-in-part of application No. 10/017,680, filed on Oct. 22, 2001, now Pat. No. 7,302,634.

(60) Provisional application No. 60/275,809, filed on Mar. 14, 2001.

(51) Int. Cl.
*G06F 17/30* (2006.01)

(52) U.S. Cl. .................... 707/102; 707/10; 709/206

(58) Field of Classification Search .................. 707/10, 707/101, 102; 709/200, 203, 206, 220, 245, 709/207; 717/106; 705/10

See application file for complete search history.

(56) References Cited

U.S. PATENT DOCUMENTS

| 5,446,880 | A | * | 8/1995 | Balgeman et al. ............... 707/9 |
| 5,487,141 | A | * | 1/1996 | Cain et al. ................... 715/764 |
| 5,634,053 | A | * | 5/1997 | Noble et al. .................... 707/4 |
| 5,666,534 | A | * | 9/1997 | Gilbert et al. ................... 713/1 |
| 5,742,905 | A | * | 4/1998 | Pepe et al. ................... 455/461 |
| 5,754,111 | A | * | 5/1998 | Garcia ...................... 340/573.1 |
| 5,790,785 | A | * | 8/1998 | Klug et al. ..................... 726/11 |
| 5,819,092 | A | * | 10/1998 | Ferguson et al. ............. 717/113 |
| 5,862,325 | A | * | 1/1999 | Reed et al. ................... 709/201 |
| 5,864,848 | A | * | 1/1999 | Horvitz et al. .................. 707/6 |
| 5,956,730 | A | * | 9/1999 | Burroughs et al. ......... 707/104.1 |
| 5,974,416 | A | * | 10/1999 | Anand et al. .................. 707/10 |
| 5,983,273 | A | * | 11/1999 | White et al. ................. 709/229 |
| 5,987,454 | A | * | 11/1999 | Hobbs ........................... 707/4 |
| 5,999,932 | A | * | 12/1999 | Paul ............................ 707/10 |
| 6,018,343 | A | * | 1/2000 | Wang et al. ................. 715/733 |

(Continued)

*Primary Examiner*—Shahid A Alam

(57) ABSTRACT

Described is a schema-based notification platform that provides regularized notification handling including user control and normalization of the operation of policies across different information types and contexts. Information-service schemas and services are combined to build a content-sensitive and context-sensitive information service to communicate information to recipient devices of users that subscribe to those services. An information agent service collects the information, and based on various criteria, determines if, when, and how to send and render the information, and to which subscribing client device or devices. The set of schemas include a notification schema that represents the subscription of a service to an information source and details about that information, and a device schema that represents information about user devices. The information agent service accesses criteria including user preferences and user contextual information, including presence information, location information, and schedule information along with people and groups data and extended-context data.

19 Claims, 8 Drawing Sheets

U.S. PATENT DOCUMENTS 6,021,403 A * 2/2000 Horvitz et al. ................ 706/45
6,023,223 A * 2/2000 Baxter, Jr. ................... 340/531

| | | | | |
|---|---|---|---|---|
| 6,044,372 A * | 3/2000 | Rothfus et al. ............... 707/10 |
| 6,052,720 A * | 4/2000 | Traversat et al. ............ 709/220 |
| 6,081,840 A * | 6/2000 | Zhao ........................ 709/224 |
| 6,122,348 A * | 9/2000 | French-St. George et al. .... 379/88.23 |
| 6,141,778 A * | 10/2000 | Kane et al. .................... 726/4 |
| 6,148,301 A * | 11/2000 | Rosenthal .................... 707/10 |
| 6,161,125 A * | 12/2000 | Traversat et al. ............ 709/203 |
| 6,161,139 A * | 12/2000 | Win et al. ................... 709/225 |
| 6,167,408 A * | 12/2000 | Cannon et al. ............... 707/203 |
| 6,185,551 B1 * | 2/2001 | Birrell et al. .................. 707/3 |
| 6,266,690 B1 * | 7/2001 | Shankarappa et al. ....... 709/202 |
| 6,269,369 B1 * | 7/2001 | Robertson .................... 707/10 |
| 6,275,824 B1 * | 8/2001 | O'Flaherty et al. .............. 707/9 |
| 6,317,783 B1 * | 11/2001 | Freishtat et al. ............. 709/218 |
| 6,324,544 B1 * | 11/2001 | Alam et al. .................. 707/201 |
| 6,334,151 B1 * | 12/2001 | Bolam et al. ................ 709/225 |
| 6,336,119 B1 * | 1/2002 | Banavar et al. .......... 707/104.1 |
| 6,343,287 B1 * | 1/2002 | Kumar et al. ................... 707/4 |
| 6,401,085 B1 * | 6/2002 | Gershman et al. .............. 707/4 |
| 6,405,191 B1 * | 6/2002 | Bhatt et al. ..................... 707/3 |
| 6,414,635 B1 * | 7/2002 | Stewart et al. ............... 342/457 |
| 6,415,322 B1 * | 7/2002 | Jaye ........................... 709/224 |
| 6,442,549 B1 * | 8/2002 | Schneider .................... 707/10 |
| 6,453,317 B1 * | 9/2002 | LaCost et al. ................. 707/10 |
| 6,466,232 B1 * | 10/2002 | Newell et al. ............... 715/700 |
| 6,480,850 B1 * | 11/2002 | Veldhuisen .................... 707/9 |
| 6,480,885 B1 * | 11/2002 | Olivier ....................... 709/207 |
| 6,505,167 B1 * | 1/2003 | Horvitz et al. ................. 705/9 |
| 6,516,315 B1 * | 2/2003 | Gupta ........................... 707/9 |
| 6,516,341 B2 * | 2/2003 | Shaw et al. ................. 709/206 |
| 6,526,438 B1 * | 2/2003 | Bienvenu et al. ............ 709/219 |
| 6,556,995 B1 * | 4/2003 | Child et al. .................... 707/9 |
| 6,571,279 B1 * | 5/2003 | Herz et al. ................... 709/217 |
| 6,584,564 B2 * | 6/2003 | Olkin et al. .................. 713/152 |
| 6,618,716 B1 * | 9/2003 | Horvitz ....................... 706/55 |
| 6,622,160 B1 * | 9/2003 | Horvitz ..................... 709/206 |
| 6,643,650 B1 * | 11/2003 | Slaughter et al. .............. 707/10 |
| 6,643,652 B2 * | 11/2003 | Helgeson et al. .............. 707/10 |
| 6,651,217 B1 * | 11/2003 | Kennedy et al. ............ 715/224 |
| 6,662,340 B2 * | 12/2003 | Rawat et al. ................ 715/236 |
| 6,697,865 B1 * | 2/2004 | Howard et al. .............. 709/229 |
| 6,714,967 B1 * | 3/2004 | Horvitz ....................... 709/206 |
| 6,732,080 B1 * | 5/2004 | Blants ........................... 705/9 |
| 6,789,126 B1 * | 9/2004 | Saulpaugh et al. .......... 709/245 |
| 6,792,466 B1 * | 9/2004 | Saulpaugh et al. .......... 709/229 |
| 6,839,733 B1 * | 1/2005 | Lange et al. ................. 709/202 |
| 6,931,434 B1 * | 8/2005 | Donoho et al. .............. 709/207 |
| 6,980,993 B2 * | 12/2005 | Horvitz et al. .............. 707/102 |
| 7,249,159 B1 * | 7/2007 | Horvitz et al. .............. 709/206 |
| 2001/0044827 A1 * | 11/2001 | Zhuk .......................... 709/205 |
| 2002/0013788 A1 * | 1/2002 | Pennell et al. .............. 707/207 |
| 2002/0026426 A1 * | 2/2002 | Bennett ....................... 705/64 |
| 2002/0040369 A1 * | 4/2002 | Multer et al. ................ 707/201 |
| 2002/0049749 A1 * | 4/2002 | Helgeson et al. ............... 707/3 |
| 2002/0059425 A1 * | 5/2002 | Belfiore et al. .............. 709/226 |
| 2002/0063732 A1 * | 5/2002 | Mansikkaniemi et al. ... 345/733 |
| 2002/0065881 A1 * | 5/2002 | Mansikkaniemi et al. ... 709/204 |
| 2002/0069298 A1 * | 6/2002 | Birkler et al. ............... 709/248 |
| 2002/0078204 A1 * | 6/2002 | Newell et al. ............... 709/225 |
| 2002/0080156 A1 * | 6/2002 | Abbott et al. ............... 345/700 |
| 2002/0083158 A1 * | 6/2002 | Abbott et al. ............... 709/220 |
| 2002/0095399 A1 * | 7/2002 | Devine et al. ................... 707/1 |
| 2002/0099573 A1 * | 7/2002 | Koguchi et al. ................ 705/3 |
| 2002/0099817 A1 * | 7/2002 | Abbott et al. ............... 709/224 |
| 2002/0116232 A1 * | 8/2002 | Rapp et al. ..................... 705/5 |
| 2002/0129000 A1 * | 9/2002 | Pillai et al. ..................... 707/1 |
| 2002/0154161 A1 * | 10/2002 | Friedman et al. ............ 345/740 |
| 2002/0169876 A1 * | 11/2002 | Curie et al. .................. 709/226 |
| 2003/0131073 A1 * | 7/2003 | Lucovsky et al. ............ 709/219 |
| 2003/0140112 A1 * | 7/2003 | Ramachandran et al. .... 709/217 |
| 2003/0154476 A1 * | 8/2003 | Abbott et al. .................. 725/37 |
| 2003/0220891 A1 * | 11/2003 | Fish ............................. 707/1 |
| 2003/0229529 A1 * | 12/2003 | Mui et al. ....................... 705/8 |
| 2004/0193444 A1 * | 9/2004 | Hufford et al. ................. 705/1 |
| 2004/0199663 A1 * | 10/2004 | Horvitz et al. .............. 709/238 |
| 2004/0205526 A1 * | 10/2004 | Borodovski et al. ......... 715/205 |
| 2005/0013417 A1 * | 1/2005 | Zimmers et al. ............... 379/37 |
| 2005/0065950 A1 * | 3/2005 | Chaganti et al. ............ 707/100 |

* cited by examiner

SCHEMAS FOR A NOTIFICATION PLATFORM AND RELATED INFORMATION SERVICES

CROSS REFERENCE TO RELATED APPLICATIONS

The present application is a divisional of U.S. patent application Ser. No. 10/099,467 filed Mar. 14, 2002, which is a continuation-in-part of co-pending U.S. patent application Ser. No. 10/017,680, filed Oct. 22, 2001, which claims priority to U.S. provisional application Ser. No. 60/275,809, filed Mar. 14, 2001.

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer network data access, and more particularly to systems, methods and data structures for accessing data and data-related services over a network.

BACKGROUND OF THE INVENTION

There are many types of data that users need to manage and otherwise access. For example, users keep word processing documents, spreadsheet documents, calendars and schedules, telephone numbers and addresses, e-mail and voice messages, financial information and so on. Users also want to regularly receive information from various sources, such as telephone calls, email and other readable messages, pages, alarms and so forth. Users may access this data on demand by requesting it from storage, or the data may be sent in real time to the user, e.g., as a text message on a pager, or as graphics or voicemail on a portable computing device.

In general, users receive and maintain such varied information on various devices, including personal computers, hand-held computers, pocket-sized computers, personal digital assistants, mobile phones and other electronic devices. At the same time, each typical user's situation is regularly changing. In most cases, the various sources of information have no idea of what the user is doing at a given time, what device is accessible to the user and/or what the user would prefer. For example, a user may prefer not to receive a cellular telephone call at a restaurant unless the call is an emergency, but can either leave the phone on and risk receiving other calls, or turn the phone off and risk missing the emergency call. Vibrate modes and the like can reduce the distraction, but can be missed because of inadequate alerting, and/or can still lead to regular interruptions from non-emergency calls.

What is needed is a platform that provides information to users from possibly many disparate information sources, in a manner that takes into account each user's current situation and which recipient device or devices is currently accessible to the user, and/or determined to be best for the user's current situation. The platform needs to be scalable, extensible and allow for considerable control or personalization by each user. Further, the various data that are exchanged should be well defined, so that, for example, a user's current situation can be described in a way that is consistent, or a notification from an information source is received and handled the same normalized way, regardless of the source.

SUMMARY OF THE INVENTION

Briefly, the present invention provides a method and system for using various data formats and/or schemas and services to provide regularized notification handling, and provide an opportunity for user control and normalization of the operation of policies across different information types and contexts. The information-service schemas and services are combined to build a valuable, general purpose content-sensitive and context-sensitive information service that provides a notification platform. In general, via the notification platform, information services communicate information to recipient devices of users that subscribe to those services by formatting the information according to defined schemas. An information agent service collects the information, and based on various criteria, such as one or more of the content at hand, context of the user, and a user's stored preferences about notifications, determines if, when and how to send the information, and to which subscribing client device or devices.

The set of schemas include a notification schema that represents metadata about the subscription of a service to a source of information, as well as representing details about that information, including the nature, importance, time criticality or urgency of information, disposition over time of information provided by a message, and message handling preferences. A device schema describes metadata that represents information about one or more devices (e.g., user devices) that are enlisted or provisioned by a service. The device schema represents the data directed to various device properties, including information used by the information agent service about the connection, the rendering abilities, and interactive abilities of devices.

The information agent service accesses criteria including user preferences, arranged according to a schema that provides a standardized format for encoding preference information with respect to information handling and alerting. For example, the information preferences schema contains settings on subscriptions, associated preferences and tradeoffs with. A user's default routing information and explicit settings via rules, assignments, or learned preferences are stored here.

The user's current situation is described by metadata and formats for contextual information. To this end, presence information, location information, and schedule information describe a user's situation, or context.

A user-context schema comprises a standard form for representing, storing, updating, and accessing information about a user's situation, including schedule, presence, location, and time-centric profiles or other time-sensitive situation information. This includes information received from a presence schema, which comprises a regularized data format that contains attributes about the presence of a user at or near a particular device, and a location schema, which refers to a regularized form for storing data about a user's current and/or predicted location, for encoding and sharing location information among components.

The user-context schema also includes information received according to a schedule schema, which provides a standard representation of information about different types of appointments, and for encoding recurrent periods of time and abstractions about the location, situation, and overall informational context associated different named periods of time. A client computing context schema captures registered contextual events that characterize a user's computing activities, such as interactions with the operating system and applications and various states of the computing devices resources. A people and groups schema captures information about a user's abstractions regarding other people, with a focus on different groupings of people and their properties, for example, direct reports, or people who will be meeting with the user on a given day. An extended-context schema is defined to capture information about the nature, states, and semantics associated with new sources of contextual information that a user wishes to integrate into an information service, e.g., a user may wish to add data from a conversation detector to the user-context schema so that the platform knows when (and possibly where) the user is in, or has last been in, a conversation.

With the user preference data and context data, notifications directed to the user are received by the information service and routed to an appropriate user device based on the notification metadata (e.g., its importance) versus the user's preferences and context. Alternatively, the notification may be saved for later routing, or discarded, again depending on the notification data relative to the user preference data and the user's context. The device may be selected based on the preference and context data, and the notification data may be formatted to match the device properties, including its display capabilities, current network transport capabilities, and so forth.

Other benefits and advantages will become apparent from the following detailed description when taken in conjunction with the drawings, in which:

DETAILED DESCRIPTION

Exemplary Operating Environment

Figure 1:
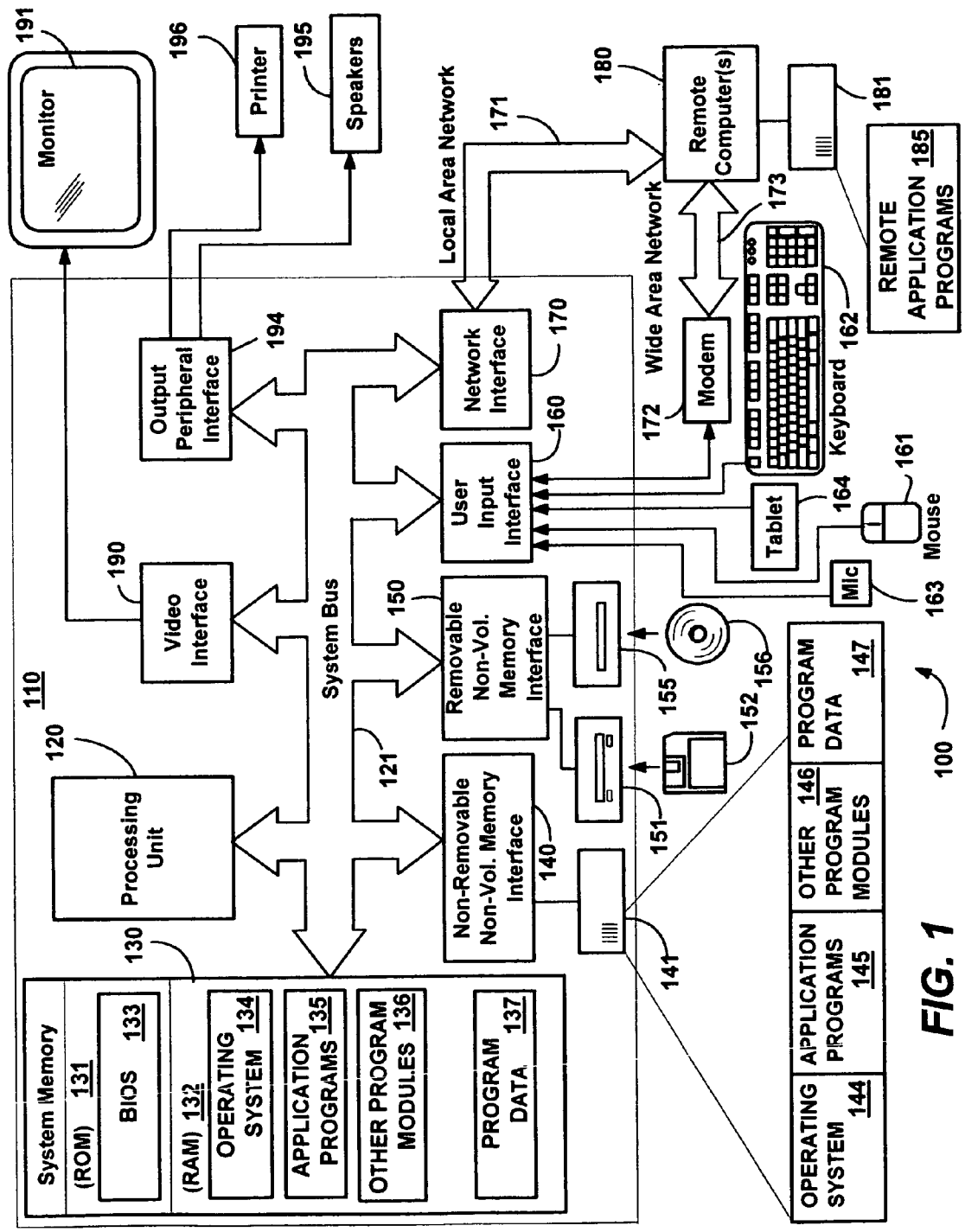
FIG. 1 is a block diagram generally representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Access Model

The present invention generally operates in an architecture/platform that connects network-based (e.g., Internet-based) applications, devices and services, and transforms them into a user's personal network which works on the user's behalf, and with permissions granted by the user. To this end, the present invention is generally directed to schema-based services that maintain user, group, corporate or other entity data in a commonly accessible virtual location, such as the Internet. The present invention is intended to scale to millions of users, and be stored reliably, and thus it is likely that a user's data will be distributed among and/or replicated to numerous storage devices, such as controlled via a server federation. As such, while the present invention will be generally described with respect to an identity-centric model that enables a user with an appropriate identity and credentials to access data by communicating with various core or other services, it is understood that the schema-based services described herein are arranged for handling the data of millions of users, sorted on a per-user-identity basis. Note that while "user" is generally employed herein for simplicity, as used herein the term "user" is really a substitute for any identity, which may be a user, a group, another entity, an automated agent, an event, a project, and so on.

Figure 2:
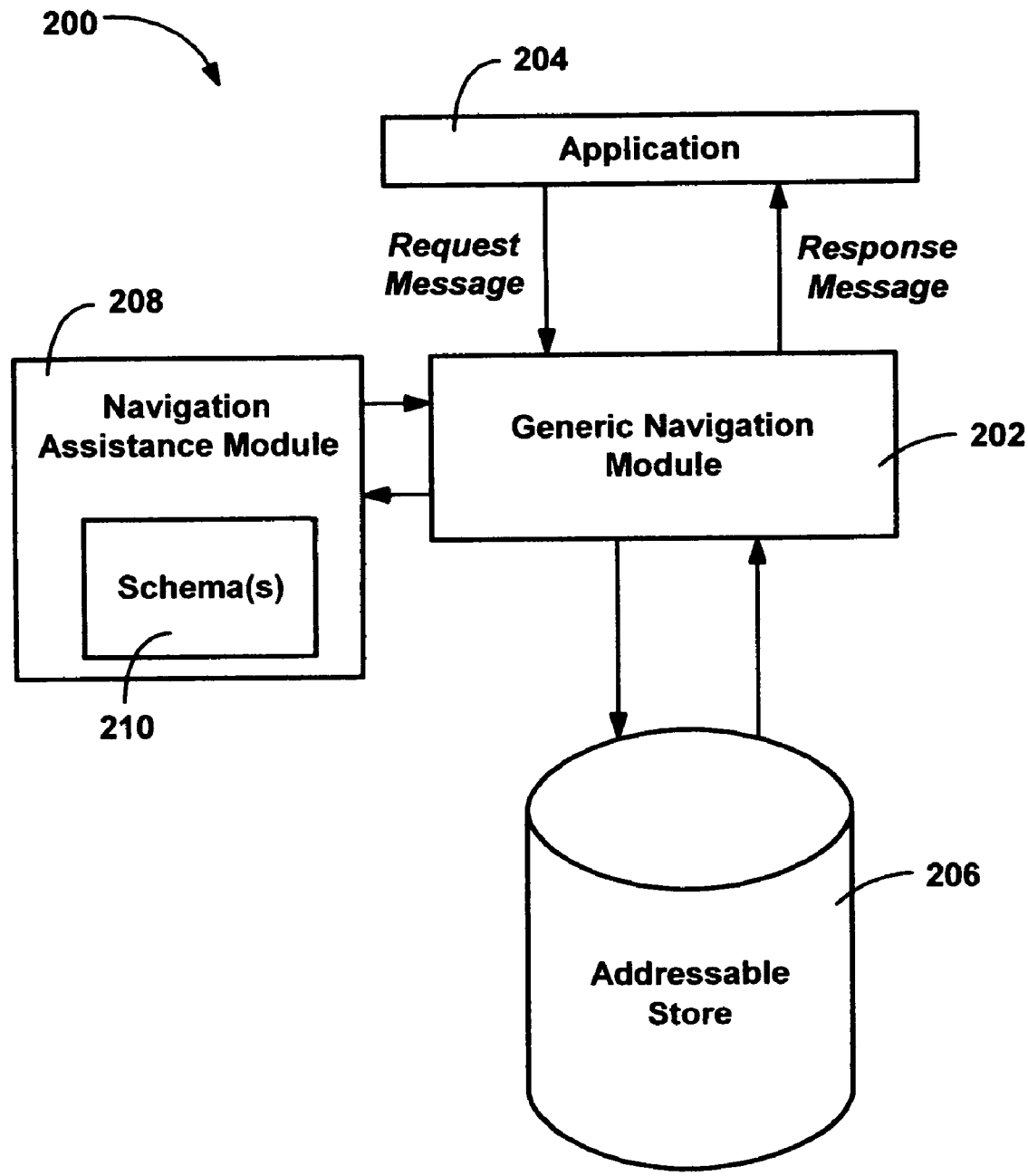
FIG. 2 is a block diagram generally representing a generic data access model in accordance with one aspect of the present invention.

As generally represented in FIG. 2, a data access model 200 includes a generic navigation module 202 through which applications 204 and the like may access a wide variety of identity-based data, such as maintained in an addressable store 206. To access the data, a common set of command methods may be used to perform operations on various data structures that are constructed from the data in the addressable store 206, even though each of those data structures may represent different data and be organized quite differently. Such command methods may describe generic operations that may be desired on a wide variety of data structures, and include, for example, insert, delete, replace, update, query or changequery methods.

In accordance with one aspect of the present invention and as described in detail below, the data is accessed according to various schemas, with the schemas corresponding to identity-based services through which users access their data. As used herein, a "schema" generally comprises a set of rules and structure that define how a data structure may be organized, e.g., what elements are supported, in what order they appear, how many times they appear, and so on. In addition, a schema may define, via color-coding or other identification mechanisms, what portions of a document (e.g., an XML document that corresponds to the data structure) may be operated on. Examples of such documents are described below as XML-based examples. The schema may also define how the structure of the XML document may be extended to include elements not expressly mentioned in the schema.

As will be understood below, the schemas vary depending on the type of data they are intended to organize, e.g., an email-inbox-related schema organizes data differently from a schema that organizes a user's favorite websites. Further, the services that employ schemas may vary. As such, the generic navigation module 202 has associated therewith a navigation assistance module 208 that includes or is otherwise associated with one or more schemas 210. As will be understood, a navigation assistance module 208 as represented in FIG. 2 corresponds to one or more services, and possesses the information that defines how to navigate through the various data structures, and may also indicate which command methods may be executed on what portions of the data structure. Although in FIG. 2 only one navigation assistance module 208 is shown coupled to the generic navigation module 202, there may be multiple navigation assistance modules that may each specialize as desired. For example, each navigation assistance module may correspond to one service. Moreover, although the navigation assistance module 208 is illustrated as a separate module, some or all of the operations of the navigation assistance module 208 may be incorporated into the generic navigation module 202, and vice versa. In one embodiment, the various data structures constructed from the schema and addressable store data may comprise XML documents of various XML classes. In that case, the navigation assistance module 208 may contain a schema associated with each of the classes of XML documents.

The present invention provides a number of schema-based services that facilitate data access based on the identity of a user. Preferably, the user need not obtain a separate identity for each service, but rather obtains a single identity via a single set of credentials, such as with the Microsoft® Passport online service. With such an identity, a user can access data via these services from virtually any network connectable device capable of running an application that can call the methods of a service.

Services and Schemas

".NET My Services" comprises identity-centric services which may be generally implemented in XML (extensible Markup Language) Message Interfaces (XMIs). While the present invention will be described with respect to XML and XMI, it can readily be appreciated that the present invention is not limited to any particular language or set of interfaces. For example, the encoding for the various schema metadata (such as the notification schema metadata) can be in different formats, e.g., the metadata may be encoded in MIME for SMTP (email), in XML for SOAP messages, or SIP, depending on the protocol and application. The .NET My Services model essentially corresponds to one implementation of the generic data access model 200 of FIG. 2.

Figure 3:
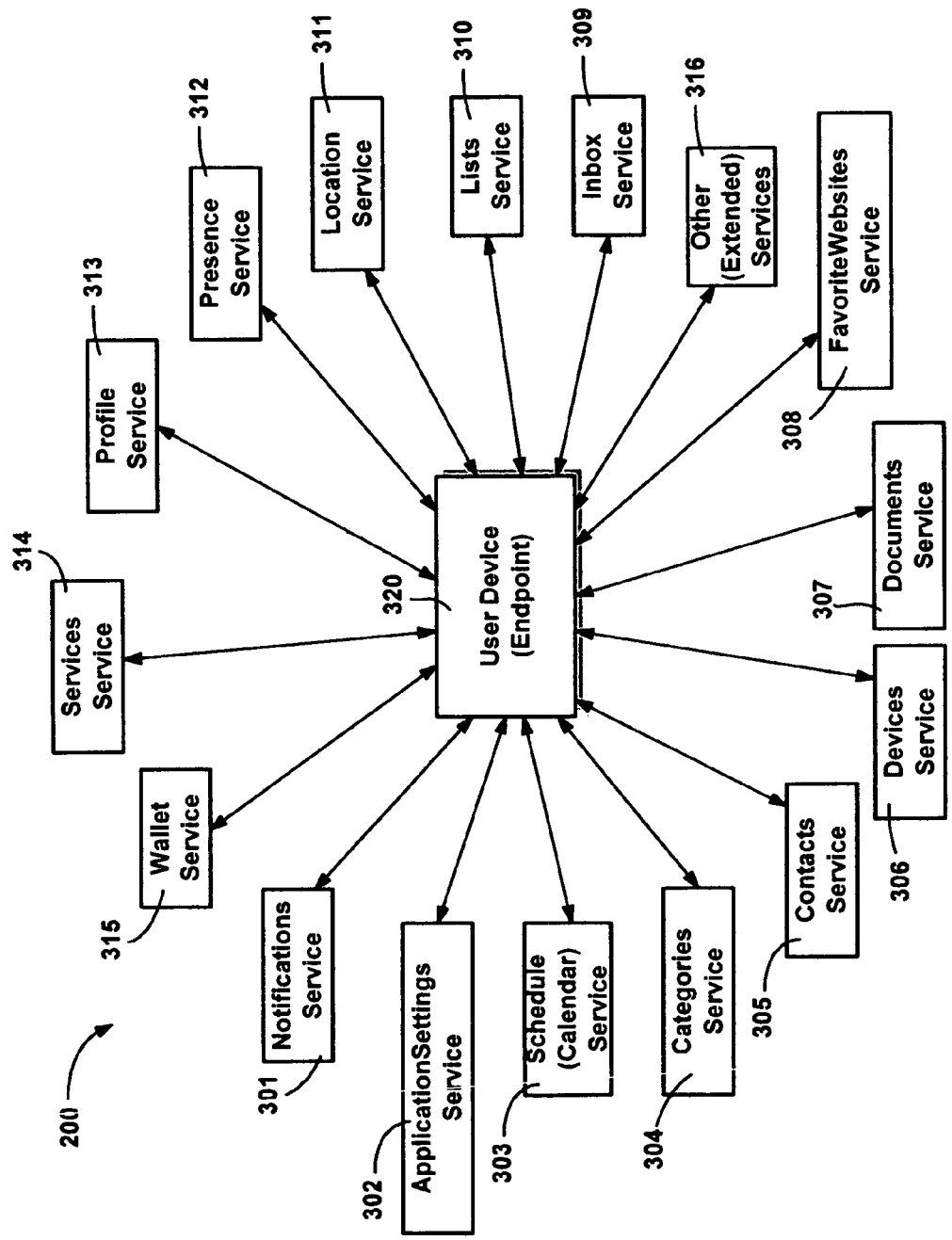
FIG. 3 is a representation of services for identity-based data access in accordance with one aspect of the present invention.

As generally represented in FIG. 3, .NET My Services 300 is implemented as a set of Web services 301-316, each bound to a .NET Identity (PUID, such as a Passport® unique identifier similar to a globally unique indentifier when Passport® is the authentication service). The services 301-316 can communicate with one another via a service-to-service communications protocol (SSCP), as described in U.S. patent application Ser. No. 60/275,809, assigned to the assignee of the present invention. As also described below, each service presents itself as a set of XML documents that can be manipulated from an application program 202 (FIG. 2) or the like using a set of standard methods and domain-specific methods. To this end, a user device 320 (endpoint) running such application programs connects a user's applications to the services, and to the data controlled by those services, such as over the Internet or an Intranet. Note that endpoints can be client devices, applications or services. In keeping with the present invention, virtually any device capable of executing software and connecting to a network in any means may thus give a user access to data that the user is allowed to access, such as the user's own data, or data that a friend, colleague or other information source has specified as being accessible to that particular user.

In general, a .NET Identity is an identifier assigned to an individual, a group of individuals, or some form of organization or project. Using this identifier, services bound to that identity can be located and manipulated. A general effect is that each identity (e.g., of a user, group or organization) has tied to it a set of services that are partitioned along schema boundaries and across different identities. As will be understood, the XML-document-centric architecture of .NET My Services provides a model for manipulating and communicating service state that is very different from prior data access models. The XML-document-centric approach, in conjunction with loose binding to the data exposed by the services, enables new classes of application programs. As will also be understood, the .NET My Services model 300 presents the various services 301-316 using a uniform and consistent service and method model, a uniform and consistent data access and manipulation model, and a uniform and consistent security authorization model.

In a preferred implementation, the .NET My Services model 300 is based upon open Internet standards. Services are accessed by means of SOAP (Simple Object Access Protocol) messages containing an XML payload. Service input and output is expressed as XML document outlines, and each of these document outlines conform to an XML schema document. The content is available to a user interacting with the .NET My Services service endpoint 320. It is understood, however, that the present invention is not limited to the .NET architecture and/or services, SOAP, and/or XML, but rather contemplates other architectures, services, protocols and document formats/markup languages.

A web service is essentially described by a schema. More particularly, a service author begins to write a web service by defining a schema (e.g., in XML) that defines what the data model looks like, e.g., the supported elements, their relative ordering, how many times they appear, and other similar definitions, as will become apparent below. This service definition also applies to an author determining what roles and methods are supported, e.g., which operations are supported, and the extent of the data that can be returned for each method. Another way of stating this concept is that the author starts by building a complete definition of a service, such as in XML, and specifies the verbs (methods) that an application will use to talk to it.

At this point, the service author has an XML definition that has been declared, and this declarative definition may be run through a compilation process, resulting in a fully operational service. It should be noted that a general purpose interpreter-like mechanism may be fed one of these declarative XML definitions, and result in a service that is capable of operating. In a simple service (e.g., with no domain-specific methods or complex logic), no new code needs to be written to provide such an operational service. As will be understood, such authoring of a service without coding is possible due to the data driven model of the present architecture. As will be understood, however, code can also be written to influence and/or work with the service generation process to add value to a service, and/or provide specific, runtime business logic that is not expressible in a declarative way.

Figure 4:
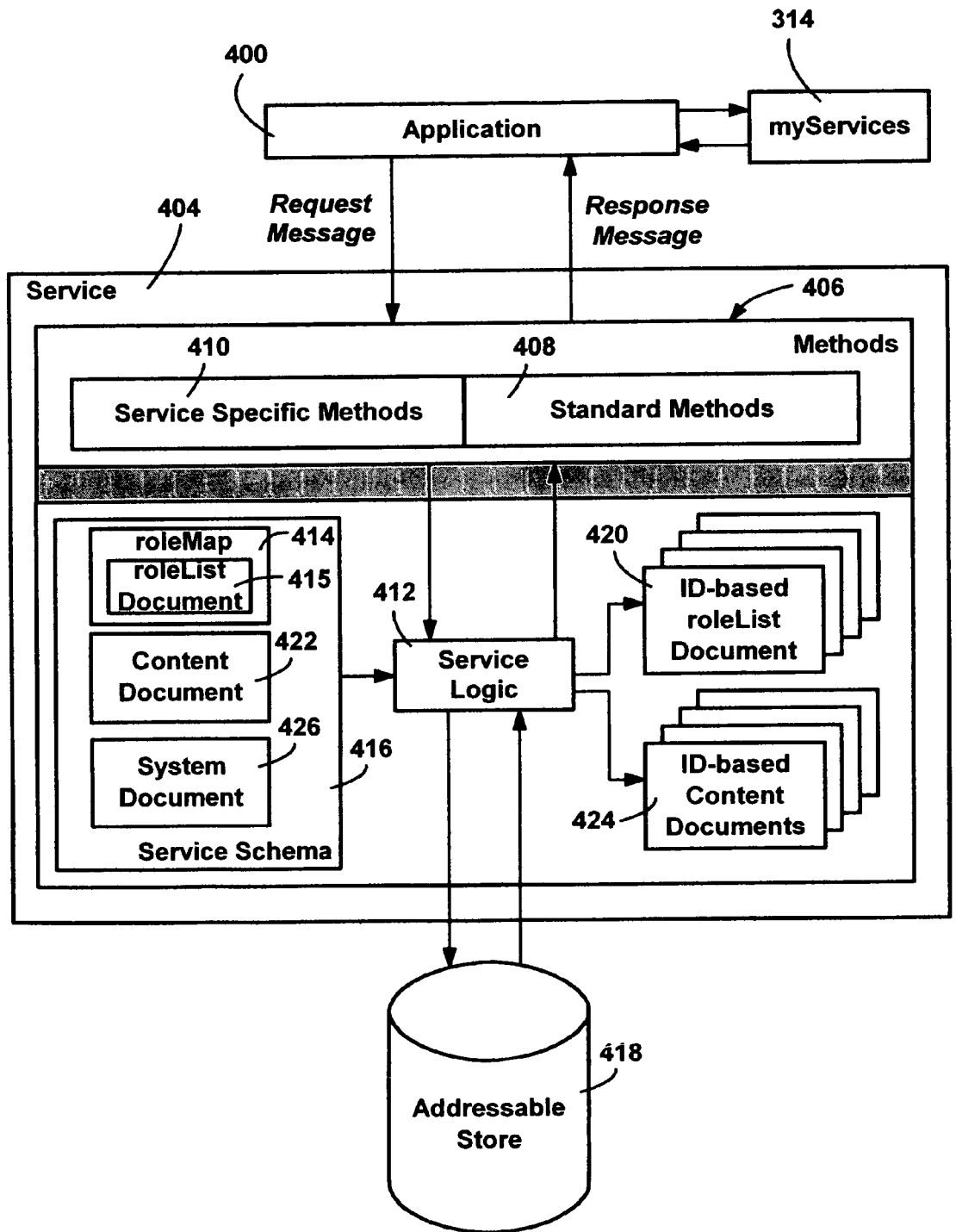
FIG. 4 is a block diagram generally representing a schema based service for accessing data arranged in a logical content document based on a defined schema for that service in accordance with one aspect of the present invention.

Turning to FIG. 4, in the .NET My Services model, an application 400 requests performance of a method that operates on data structures. The application may make a request that is generic with respect to the type of data structure being operated upon and without requiring dedicated executable code for manipulating data structures of any particular data type. To this end, the application first contacts a .NET Services service 314 (which may be referred to as .NET Service) to obtain the information needed to communicate with a particular service 404, through a set of methods 406 of that service 404. For example, the needed information received from the .NET Services service 314 includes a URI of that service 404. Note that the service 404 may correspond to essentially any of the services represented in FIG. 3.

The service 404 includes or is otherwise associated with a set of methods 406 including standard methods 408, such as to handle requests directed to insert, delete, replace, update, query or changequery operations on the data. The set of methods of a particular service may also include service specific methods 410. In general, the only way in which an application can communicate with a service are via that service's methods.

Each service includes service logic 412 for handling requests and providing suitable responses. To this end, the service logic performs various functions such as authorization, authentication, and signature validation, and further limits valid users to only the data that they are permitted to access. The security aspect of a service is not discussed herein, except to note that in general, for otherwise valid users, the user's identity determines whether a user can access data in a requested manner. To this end, a roleMap 414 comprising service-wide roleList document templates 415 and scopes (e.g., part of the overall service's schema 416), in conjunction with user-based data maintained in an addressable store 418, determines whether a particular requested method is allowed, e.g., by forming an identity-based roleList document 420. If a method is allowed, the scope information in the roleMap 414 determines a shape of data to return, e.g., how much content is allowed to be accessed for this particular user for this particular request. The content is obtained in accordance with a content document 422 in the service's schema 416 and the actual user data corresponding to that content document in the addressable store 418. In this manner, a per-identity shaped content document 424 is essentially constructed for returning to the user, or for updating the addressable store, as appropriate for the method. Note that FIG. 4 includes a number of ID-based roleList documents and ID-based content documents, to emphasize that the service 406 is arranged to serve multiple users. Also, in FIG. 4, a system document 426 is present as part of the schema 416, as described below.

Returning to FIG. 3, in one implementation, access to .NET My Services 300 is accomplished using SOAP messages formatted with .NET My Services-specific header and body content. Each of the services will accept these messages by means of an HTTP POST operation, and generate a response by "piggy-backing" on the HTTP Response, or by issuing an HTTP POST to a .NET MyServices response-processing endpoint 320. In addition to HTTP as the message transfer protocol, .NET My Services will support raw SOAP over TCP, a transfer protocol known as Direct Internet Message Encapsulation (or DIME). Other protocols for transferring messages are feasible.

Because each of the .NET My Services services are accessed by protocol, no particular client-side binding code, object models, API layers, or equivalents are required, and are thus optional. The .NET My Services model will support Web Services Description Language (WSDL). It is not mandatory that applications wishing to interact with .NET My Services services make use of any particular bindings, and such bindings are not described herein. Instead, the communication will be generally described in terms of messages that flow between requesters of a particular service and the service endpoints. In order to interact with .NET My Services, a service needs to format a .NET My Services message and deliver that message to a .NET My Services endpoint. In order to format a message, a client needs to manipulate XML document outlines, and typically perform some simple, known (public-domain) cryptographic operations on portions of the message.

In accordance with one aspect of the present invention, and as described in FIG. 4 and below, in one preferred implementation, each .NET My Services service presents three logical XML documents, a content document 422, roleList document 415 (of the roleMap 414), and a system document 426. These documents are addressable using .NET My Services message headers, and are manipulated using standard .NET My Services methods. In addition to these common methods, each service may include additional domain-specific methods. For example, the .NET Schedule service 303 might choose to expose a "getFreeBusy" method rather than expose free/busy as writeable fragments in the content document.

Each .NET My Services service thus logically includes a content document 422, which in general is the main, service-specific document. The schema for this document 422 is a function of the class of service, as will become apparent from the description of each service's schema below. For example, in the case of the .NET Schedule service 303, the content document presents data in the shape dictated by the .NET Schedule schema, whereas in the case of the .NET FavoriteWebSites service 308, the content document presents data in the shape dictated by a .NET FavoriteWebSites schema.

Each service also includes a roleList document 415 that contains roleList information, comprising information that governs access to the data and methods exported by the service 404. The roleList document is manipulated using the .NET standard data manipulation mechanisms. The shape of this document is governed by the .NET core schema's roleListType XML data type.

Each service also includes a system document 426, which contains service-specific system data such as the roleMap, schemaMap, messageMap, version information, and service specific global data. The document is manipulated using the standard .NET My Services data manipulation mechanism, although modifications are limited in a way that allows only the service itself to modify the document. The shape of this system document 426 may be governed by the system document schema for the particular service, in that each service may extend a base system document type with service specific information. Each service typically includes at least the base system portion in its system document.

As will be understood, the present invention employs schemas for normalizing data exchange, which in general comprise a set of rules or standards that define how a particular type of data can be structured. Note that although the schemas are defined into regularized/standardized properties, they are not necessarily fixed, as extensibility is built into each of the schemas. Via the schemas, the meaning of data, rather than just the data itself, may be communicated between computer systems. For example, a computer device may recognize that a data structure that follows a particular address schema represents an address, enabling the computer to "understand" the component part of an address. The computer device may then perform intelligent actions based on the understanding that the data structure represents an address. Such actions may include, for example, the presentation of an action menu to the user that represents things to do with addresses. Schemas may be stored locally on a device and/or globally in a federation's "mega-store." A device can keep a locally-stored schema updated by subscribing to an event notification service (in this case, a schema update service) that automatically passes messages to the device when the schema is updated. Access to globally stored schemas is controlled by the security infrastructure.

Figure 5:
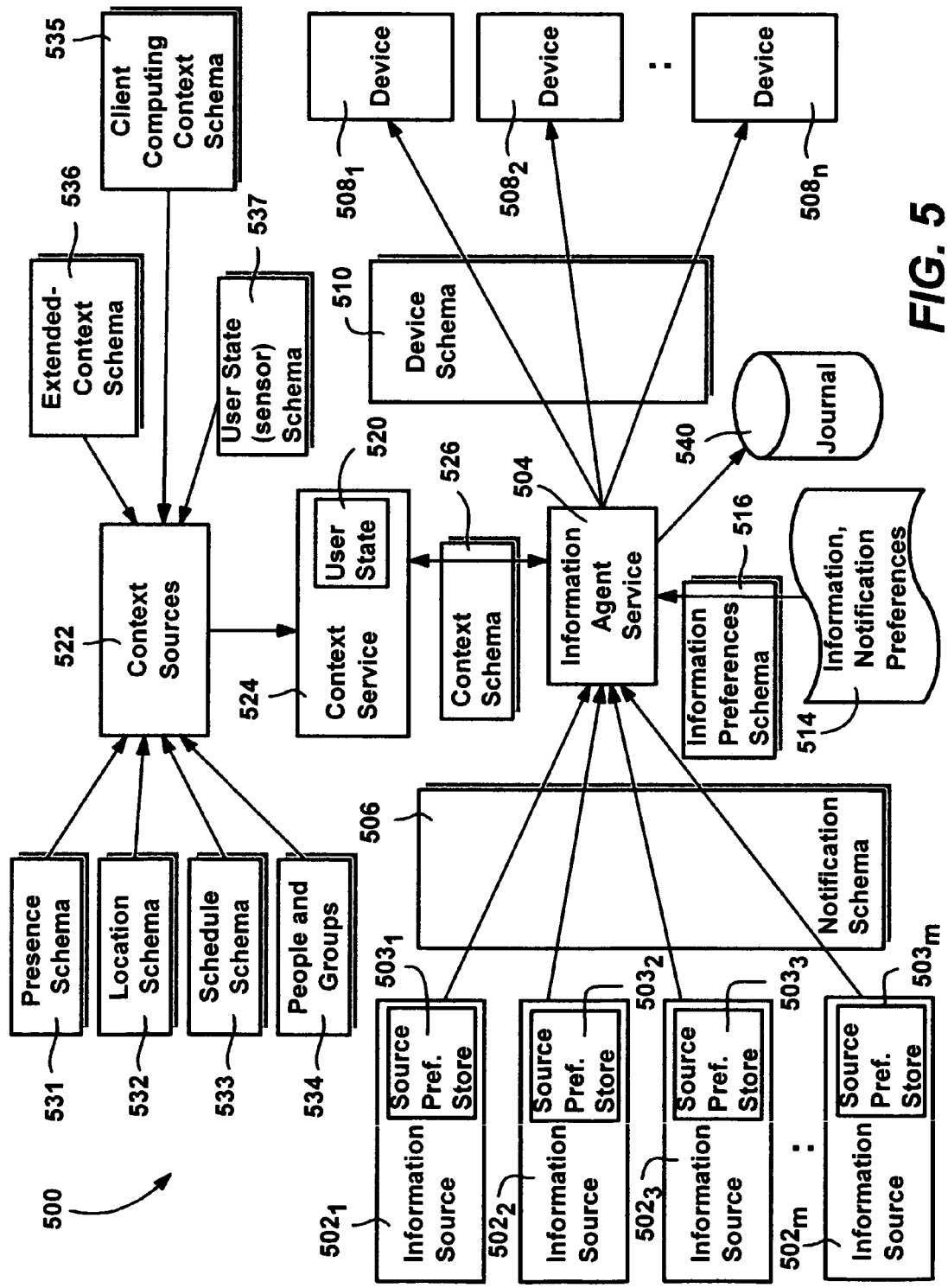
FIG. 5 is a block diagram generally representing a notification platform that handles data regularized according to schemas to provide criteria-controlled notifications in accordance with one aspect of the present invention.

A number of the services 301-315 (FIG. 2) are referred to as core services, which employ schemas to manage access to the data that most users will likely need. Other services, referred to as extended services 216, will also employ schemas in the same manner, but are more likely to be desirable to certain users and not others. Examples of extended schemas include services such as .NET Portfolio, .NET Photos, .NET Travel, .NET Music, .NET Movies, .NET TV, .NET Wishlist, .NET School, .NET Groceries, .NET News, .NET Sports, .NET TopScores and so on. Note that FIG. 3 shows only one exemplary set of core services, and that other core services implementations may include different services, a different combination of these services (i.e. a subset), and/or additional services which may be considered as "core" services. For example, the schemas represented in FIG. 5 are each associated with a service that may be considered a "core service," such as the context service.

.NET Notifications

The .NET Notification (myNotification) service is designed to deliver notifications to an identity. This service can be used by any application or service to send and/or receive notifications rooted from an identity. The service represents itself as queue of notifications, that can be pushed via a SOAP message using SMXP routing or polled via the query method.

Logically, the myNotifications service is broken up into distinct sections as represented by the content XML document, including notifications, the section that contains the queue of notifications. Each notification is defined by a standardized schema, with attributes that assist consumers of these notifications in scoping which notifications are interesting or not. The body of the notification can be customized by each notification provider. Notifications may be handled in different ways depending on the configuration of the service and the nature of the notification. For example, notifications may reside in this queue until their "Time to live" parameter expires, regardless whether they have been read or not.

Another section is the notification streams section, which contains the list of notification streams currently active against the myNotification service for a given identity. A notification contains two elements, namely an SMXP message path used to route (i.e. push) notifications to their final destination, and a scoping expression (i.e. XPATH) used to filter what notifications are sent down the message path. A notification stream is registered with myNotifications for a given identity, by adding/updating notificationStream element(s) to the notification Streams section of the document using the common add, update methods.

Another section is the notification preferences section, which contains various notification preferences, including a doFirst SMXP message path element, which users can set such that the myNotifications service automatically routes incoming notifications to the specified path. This is accomplished by simply chaining this path into the path specified in a notification stream. The doFirst path is important for use with decision making notification routers that obtain the notification first in order to do some processing prior to it being routed to its final destination.

When a new notification is added into the myNotifications queue for an identity, (via the addNotification method), the following logic occurs within the myNotifications service, as shown below:

```
foreach notificationStream in notificationStreams
{
    if (notificationStream.location MATCHES notification)
    {
        if (notificationPreferences.doFirstPath)
        {
            pushPath = notificationPreferences.doFirstPath +
            notificationStream.path;
            status = push(notification, pushPath);
            registerErrorStatus(status, pushPath, notificationStream);
        }
        else
        {
            status = push(notification, notificationStream.path);
            registerErrorStatus(status, notificationStream.path,
            notificationStream);
        }
    }
}
```

To summarize, when a new notification enters the myNotifications queue, the service iterates through each notificationStream registered in the notificationStreams section and attempts to match the notificationStream's location expression against the new notification. If a successful match occurs, myNotifications will attempt to push the notification to the notificationStream's path unless a global doFirstPath is registered in notificationPreferences. Note that the service does not stop because a match occurred on a stream. Instead, the service inspects each registered notification stream to see if the notification satisfies other streams as well. In this way, multiple readers of the notification stream are supported. If significant sequential errors are detected while pushing notifications down that message path, the message path is deleted.

Notifications may be read by using the standard query method, however the preferred method is for myNotifications to push the notification via a SOAP message using SMXP routing mechanisms. In order to accomplish this push mechanism, clients need to have an SMXP aware connection to the myNotifications service, which, for example, may be accomplished by calling the getChannelAddress method, which yields an smxp://mynotifications.microsoft.net:1280 type of response. Given this URI, the client can connect and bind to this address.

Once a successful connection is established, the myNotifications service names this message Path (e.g., 'vid="cid: 12385345@mynotifications.microsoft.net"'). The naming of this message Path is accomplished by sending a getChannelName message on the just established channel. Once the message path is succesfully named, both clients and the myNotification service may use this name to describe a section in a message path which details how messages are routed to their final destination. These message paths can be set with optional filters in the notificationStreams section of the service.

Each notification contains a Time to Live field <notificationTTL>. Once the specified time expires, the notification may be deleted or logged from the queue (depending on the setting). Notification providers that generate the notification set this Time to Live value based on internal defaults or other user preferences.

Each notification is standardized by the .NET schemas, but applications can use the body element to add additional information that is not described in the notification schema. Addition of free form data is allowed within the body, but use of the schematized extensions within the body element is encouraged to allow shredding of the XML data as well as queries within.

.NET Notifications/Roles

The .NET Notifications service controls access by using the roleTemplates, rt0, rt1, rt2, rt3, and rt99, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
```

-continued

```
    <hs:shape base=nil>
      <hs:include select=//*[cat/@ref='hs:public']/>
      <hs:include select=//subscription[@creator='$callerId']/>
    </hs:shape>
  </hs:scope>
```

The .NET Notifications roleTemplate rt0 role gives give complete read/write access to the information within the content document of the service being protected through this roleTemplate. The following table illustrates the available methods and the scope in effect when accessing the .NET Notifications service through that method while mapped to this roleTemplate.

TABLE

.NET Notifications roleTemplate rt0

| method | scope/name |
| --- | --- |
| query | allElements |
| insert | allElements |
| replace | allElements |
| delete | allElements |
| update | allElements |

The .NET Notifications roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the .NET Notifications service through that method while mapped to this roleTemplate:

TABLE

.NET Notifications roleTemplate rt1

| method | scope/name |
| --- | --- |
| Query | allElements |
| Insert | onlySelfElements |
| Replace | onlySelfElements |
| Delete | onlySelfElements |

The .NET Notifications roleTemplate rt2 gives complete read access to all information within the content document of the service being protected through this roleTemplate. Applications mapping to this role have very limited write access and are only able to create and manipulate their own subscription nodes. The following table illustrates the available methods and the scope in effect when accessing the .NET Notifications service through that method while mapped to this roleTemplate.

TABLE

.NET Notifications roleTemplate rt2

| method | scope/name |
| --- | --- |
| query | allElements |
| insert | onlySelfSubscriptionElements |
| replace | onlySelfSubscriptionElements |
| delete | onlySelfSubscriptionElements |

TABLE-continued

.NET Notifications roleTemplate rt2

| method | scope/name |
| --- | --- |

The .NET Notifications roleTemplate rt3 gives limited read access to information within the content document that is categorized as "public." The following table illustrates the available methods and the scope in effect when accessing the .NET Notifications service through that method while mapped to this roleTemplate:

TABLE

.NET Notifications roleTemplate rt3

| method | scope/name |
| --- | --- |
| query | onlyPublicElements |

The .NET Notifications roleTemplate rt99 blocks access to the content document. Note that lack of a role in the roleList has the same effect as assigning someone to rt99. The following table illustrates that there are no available methods and the scope in effect when accessing the .NET Notifications service through that method while mapped to this roleTemplate (note that in other services described herein, such an empty table will not be repeated):

TABLE

.NET Notifications roleTemplate rt99

| method | scope/name |
| --- | --- |

.NET Notification (myNotifications)—Content

The Notification content document based on the notification schema is an identity-centered document. Its content and meaning are a function of the Passport Unique ID (PUID) used to address the service. Access to the document is controlled by the associated roleList document. This schema outline illustrates the layout and meaning of the information found in the content document for the myNotifications service. The format is similar to those presented in the aforementioned U.S. patent application Ser. No. 10/017,680.

```
<m:myNotifications changeNumber="..." instanceId="..."
   xmlns:m="http://schemas.microsoft.com/hs/2002/04/myNotifications"
   xmlns:hs="http://schemas.microsoft.com/hs/2002/04/core">_{1..1}
   <m:notification changeNumber="..." uuid="..." replace="..."
threadId="..." class="..." id="...">_{0..unbounded}
      <m:notificationId>_{0..1}
         <m:timeStamp>_{1..1}</m:timeStamp>
         <m:trackingNumber>_{1..1}</m:trackingNumber>
      <m:notificationId>
      <m:identityHeader type="...">_{1..1}
         <m:onBehalfOfUser>_{1..1}</m:onBehalfOfUser>
         <m:licenseHolder>_{1..1}</m:licenseHolder>
         <m:platformId>_{1..1}</m:platformId>
      <m:identityHeader>
      <m:title xml:lang="..." dir="...">_{0..1}</m:title>
      <m:notificationTTL action="...">_{0..1}
         <m:TTL>_{1..1}</m:TTL>
      </m:notificationTTL>
      <m:informationValue type="...">_{0..1}
         <m:value>_{0..1}</m:value>
         <m:function type="...">_{0..1}
            <m:parameters>_{0..1}</m:parameters>
         </m:function>
         <m:conditional>_{1..1}
            <m:context>_{0..1}</m:context>
            <m:value>_{0..1}</m:value>
            <m:function type="...">_{0..1}
               <m:parameters>_{0..1}</m:parameters>
            </m:function>
         </m:conditional>
      </m:informationValue>
      <m:siteUrl>_{0..1}</m:siteUrl>
      <m:actionPath>_{0..1}</m:actionPath>
      <m:ackPath>_{0..1}</m:ackPath>
      <m:subscriptionPath>_{0..1}</m:subscriptionPath>
      <m:bodyImageUrl>_{0..1}</m:bodyImageUrl>
      <m:body>_{0..1} {any}</m:body>
      <m:endPointDelivered>_{0..unbounded}</m:endPointDelivered>
   </m:notification>
   <m:notificationEndPoint changeNumber="..." type="..."
id="...">_{0..unbounded}
      <m:name>_{1..1}</m:name>
      <m:deviceUuid>_{1..1}</m:deviceUuid>
      <m:path>_{1..1}</m:path>
      <m:xpLocation>_{0..1}</m:xpLocation>
      <m:sequentialErrorCount>_{0..1}</m:sequentialErrorCount>
   </m:notificationEndPoint>
   <m:notificationPreference changeNumber="..." id="...">_{0..1}
      <m:doFirstPath>_{0..1}</m:doFirstPath>
      <m:logPath>_{0..1}</m:logPath>
      <m:sequentialErrorCount>_{0..1}</m:sequentialErrorCount>
   </m:notificationPreference>
</m:myNotifications>
```

The meaning of the attributes and elements shown in the preceding sample document fragment are listed in the following section. The /myNotifications (minOccurs=1 maxOccurs=1)/myNotifications/@changeNumber (minOccurs=maxOccurs=1) /myNotifications/@instanceId (minOccurs=0maxOccurs=1)/myNotifications/notification (minOccurs=0 maxOccurs=unbounded)/myNotifications/notification/@changeNumber (minOccurs=1 maxOccurs=1) elements identify the notification document and provide version data. The /myNotifications/notification/@uuid (minOccurs=0 maxOccurs=1) attribute contains the uuid chosen by the application during subscribe time. Its primary use is to support multiple readers of notifications from the same class of service.

The /myNotifications/notification/@replace (minOccurs=0 maxOccurs=1) describes whether a later notification can replace this notification. Possible values include "sameUuid", "sameClass", and "sameThreadId." The /myNotifications/notification/@threadId (minOccurs=0 maxOccurs=1) field provides the notification thread id; notifications with the same thread id can be collapsed. The /myNotifications/notification/@class (minOccurs=0 maxOccurs=1) attribute contains a URI that specifies what class of notificationProvider created this notification. The class defines what the body of the notification will contain.

The /myNotifications/notification/@id (minOccurs=1 maxOccurs=1) /myNotifications/notification/notificationId (minOccurs=0 maxOccurs=1) /myNotifications/notification/notificationId/timeStamp (minOccurs=1 maxOccurs=1) timeStamp details when the notification was received by the notification service and inserted into an identities queue. This is referred to as Time zero for a notification.

The /myNotifications/notification/notificationId/trackingNumber (minOccurs=1 maxOccurs=1) element contains a unique Id generated by the myNotifiations service for tracking purposes. It is used to uniquely identify every distinct notification that passes through the system. This value is not assigned by user, application, or notification provider.

The /myNotifications/notification/identityHeader (minOccurs=1 maxOccurs=1) /myNotifications/notification/identityHeader/@(minOccurs=0 maxOccurs=1) type attribute presently has only two possible values: User or Automated. If the value is User, the notification was generated by a real user identity. If the value is Automated, this notification was generated from an automated agent.

The /myNotifications/notification/identityHeader/onBehalfOfUser (minOccurs=1 maxOccurs=1) element contains the identity header element describing the user who inserted this notification into the queue.

The /myNotifications/notification/identityHeader/licenseHolder (minOccurs=1 maxOccurs=1) element contains the identity header element describing the application who inserted this notification into the queue. The /myNotifications/notification/identityHeader/platformId (minOccurs=1 maxOccurs=1) element contains the identity header element describing the platformId who inserted this notification into the queue.

The /myNotifications/notification/title (minOccurs=0 maxOccurs=1) optional element contains the title of the notification from a specific class. Its primary use is to help group the same type of notification from the same class. For example, class="http://schemas.microsoft.com/moneycentral" and title="MSFT stock quote".

The /myNotifications/notification/title/@xml:lang (minOccurs=1 maxOccurs=1) required attribute is used to specify a language code compliant with RFC 3066 as described in RFC 3066 (more information is available from the W3C). If the language code is unknown, a value of "und" should be used, as per RFC 3066. Applications are expected to undertake reasonable effort to determine the input language and store it with the data. Applications should preserve a previously set xml:lang attribute in cases in which the string itself in not changed by the application. The /myNotifications/notification/title/@dir (minOccurs=0 maxOccurs=1) optional attribute specifies the default layout direction for the localized string. Valid values are rtl (right to left) and ltr (left to right).

The /myNotifications/notification/notificationTTL (minOccurs=0 maxOccurs=1) /myNotifications/notification/notificationTTL/@action (minOccurs=0 maxOccurs=1) action attribute details what is done with the notification after the Time to Live expires. There are presently two possible values, delete or log. Delete will delete the notification once the time has expired, while log will log it to user storage (logPath within notificationPreferences points where it will be logged). The /myNotifications/notification/notificationTTL/TTL (minOccurs=1 maxOccurs=1) element specifies when (in UTC) the notification should be expired.

The /myNotifications/notification/informationValue (minOccurs=0 maxOccurs=1) /myNotifications/notification/informationValue/@type (minOccurs=0 maxOccurs=1) /myNotifications/notification/informationValue/value (minOccurs=0 maxOccurs=1) /myNotifications/notification/informationValue/function (minOccurs=0 maxOccurs=1) /myNotifications/notification/informationValue/function/@type (minOccurs=0 maxOccurs=1) /myNotifications/notification/informationValue/function/parameters (minOccurs=0 maxOccurs=1)/myNotifications/notification/informationValue/conditional (minOccurs=1 maxOccurs=1)/myNotifications/notification/informationValue/conditional/context (minOccurs=0 maxOccurs=1) /myNotifications/notification/informationValue/conditional/value (minOccurs=0 maxOccurs=1)/myNotifications/notification/informationValue/conditional/function (minOccurs=0 maxOccurs=1) /myNotifications/notification/informationValue/conditional/function/type (minOccurs=0 maxOccurs=1) /myNotifications/notification/informationValue/conditional/function/parameters (minOccurs=0 maxOccurs=1) fields contain the notification data.

The /myNotifications/notification/siteUrl (minOccurs=0 maxOccurs=1) optional element encapsulates the base URL to which the notification can be traced. The other Url types are rooted from here. The /myNotifications/notification/actionPath (minOccurs=0 maxOccurs=1) optional element encapsulates the path from the base URL used to perform any action requested by this notification. The /myNotifications/notification/ackPath (minOccurs=0 maxOccurs=1) optional element encapsulates the path from the base URL used to perfom any acknowledgment requested by this notification. The /myNotifications/notification/subscriptionPath (minOccurs=0 maxOccurs=1) optional element encapsulates the path from the base URL used to perfom any subscription adjustments that generated this notification. The /myNotifications/notification/bodyImageUrl (minOccurs=0 maxOccurs=1) optional element encapsulates an URL to an Image (icon/branding) used to identify this notification. This can also be a local URL.

The /myNotifications/notification/body (minOccurs=0 maxOccurs=1) /myNotifications/notification/body/{any} (minOccurs=0 maxOccurs=unbounded) allows for extended notification data.

The /myNotifications/notification/endPointDelivered (minOccurs=0 maxOccurs=unbounded) element specifies endPoints this notification has been delivered to. The /myNotifications/notificationEndPoint (minOccurs=0 maxOccurs=unbounded) /myNotifications/notificationEndPoint/@changeNumber (minOccurs=1 maxOccurs=1) /myNotifications/notificationEndPoint/@type (minOccurs=0 maxOccurs=1) details what kind of end point, for example, "SOAP-RP", "SMTP", "SMS", "UDP", "HTTP", "TCP" and so forth. The /myNotifications/notificationEndPoint/@id (minOccurs=1 maxOccurs=1) /myNotifications/notificationEndPoint/name (minOccurs=1 maxOccurs=1) optional element provides a descriptive name for this end point. The /myNotifications/notificationEndPoint/deviceUuid (minOccurs=1 maxOccurs=1) optional element provides a place to store the device UUID for this notification end point. It can be used to retrieve presence info from myPresence for intelligent routing. The /myNotifications/notificationEndPoint/path (minOccurs=1 maxOccurs=1) element contains the path expression that defines the message path for the end point. The syntax of this element is determined by the end point type. For example, if it is SMTP, the path is in the format of "user1@microsoft.net".

The /myNotifications/notificationEndPoint/xpLocation (minOccurs=0 maxOccurs=1) location element is used to help scope the notification matching. The /myNotifications/notificationEndPoint/sequentialErrorCount (minOccurs=0 maxOccurs=1) location contains the number of serious sequential errors detected while pushing notifications along this path. Once this reaches a predetermined count, the service determines that the path is unreachable, and this notificationEndPoint is removed.

The /myNotifications/notificationPreference (minOccurs=0 maxOccurs=1) /myNotifications/notificationPreference/(changeNumber (minOccurs=1 maxOccurs=1) /myNotifications/notificationPreference/@id (minOccurs=1 maxOccurs=1) detail preference data.

The /myNotifications/notificationPreference/doFirstPath (minOccurs=0 maxOccurs=1) optional element expresses the global SOAP-RP message path to route SOAP messages first. The /myNotifications/notificationPreference/logPath (minOccurs=0 maxOccurs=1) optional element is a URI that points to user supplied storage used to log notifications when they expire (as specified in notificationTTL).

The /myNotifications/notificationPreference/sequentialErrorCount (minOccurs=0 maxOccurs=1) location contains the number of serious sequential errors detected while pushing notifications along this path. Once this reaches a predetermined count, the service determines that the path is unreachable, and the doFirstPath is deleted.

.NET Notifications (myNotifications)—System

The system document is a global document for the service. Its content and meaning are independent of the Passport Unique ID (PUID) used to address the service, and the document is read only to all users. The system document contains a set of base items common to all .NET My Services, and is optionally extended by each service to include service-specific global information.

This schema outline illustrates the layout and meaning of the information found in the system document for the myNotifications service:

```
<sys:system changeNumber="..." instanceId="..."
  xmlns:hs="http://schemas.microsoft.com/hs/2002/04/core"
  xmlns:sys="http://schemas.microsoft.com/hs/2002/04/myNotifications/
  system">_{1..1}
    <hs:systemVersion changeNumber="..." id="...">_{1..1}
      <hs:version minorVersion="..." majorVersion="..." qfe="..."
      buildNumber="...">_{1..1}
        <hs:productReleaseName>_{1..1}</hs:productReleaseName>
        <hs:productImplementationName>_{1..1}
        </hs:productImplementationName>
      </hs:version>
      <hs:buildDate>_{1..1}</hs:buildDate>
      <hs:buildDetails machine="..." type="..." branch="..."
official="...">_{1..1}</hs:buildDetails>
    </hs:systemVersion>
    <hs:roleMap changeNumber="..." id="...">_{1..1}
      <hs:scope id="...">_{0..unbounded}
        <hs:name xml:lang="..." dir="...">_{0..unbounded}</hs:name>
        <hs:shape base="...">_{1..1}
          <hs:include select="...">_{0..unbounded}</hs:include>
          <hs:exclude select="...">_{0..unbounded}</hs:exclude>
        </hs:shape>
      </hs:scope>
      <hs:roleTemplate name="...">_{0..unbounded}
        <hs:fullDescription xml:lang="..." dir="...">_{0..1}
        </hs:fullDescription>
        <hs:method name="..." scopeRef="...">_{0..unbounded}</hs:method>
      </hs:roleTemplate>
    </hs:roleMap>
    <hs:methodMap changeNumber="..." id="...">_{1..1}
      <hs:method name="...">_{0..unbounded} {any}</hs:method>
    </hs:methodMap>
    <hs:schemaMap changeNumber="..." id="...">_{1..1}
      <hs:schema namespace="..." schemaLocation="..."
      alias="...">_{0..unbounded}
{any}</hs:schema>
    </hs:schemaMap>
    <hs:wsdlMap changeNumber="..." id="...">_{1..1}
      <hs:wsdl wsdlLocation="...">_{0..unbounded} {any}</hs:wsdl>
      <hs:disco discoLocation="...">_{0..unbounded} {any}</hs:disco>
      <hs:wsil wsilLocation="...">_{0..unbounded} {any}</hs:wsil>
    </hs:wsdlMap>
    {any}
</sys:system>
```

The meaning of the attributes and elements shown in the preceding sample document fragment are listed below. The /system (minOccurs=1 maxOccurs=1) element encapsulates the system document for the Microsoft® .NET Notifications service. The /system/@changeNumber (minOccurs=1 maxOccurs=1)/system/@instanceId (minOccurs=0 maxOccurs=1)/system/systemVersion (minOccurs=1 maxOccurs=1) /system/systemVersion/@changeNumber (minOccurs=1 maxOccurs=1) /system/systemVersion/@id (minOccurs=1 maxOccurs=1)/system/systemVersion/version (minOccurs=1 maxOccurs=1),/system/systemVersion/version/@minorVersion (minOccurs=1 maxOccurs=1) attributes identify the system and version information of the .NET service.

The /system/systemVersion/version/@majorVersion (minOccurs=1 maxOccurs=1) attribute specifies the major version number of the .NET service, while the /system/systemVersion/version/@qfe (minOccurs=1 maxOccurs=1) attribute specifies the quick-fix engineering (QFE) version number of the .NET service. The /system/systemVersion/version/@buildNumber (minOccurs=1 maxOccurs=1) attribute specifies the build number of the .NET service. The /system/systemVersion/version/productReleaseName (minOccurs=1 maxOccurs=1) element defines the major product release string (for example, ".NET My Services Beta 1".) The /system/systemVersion/version/productImplementationName (minOccurs=1 maxOccurs=1) element defines the class of the service to differentiate between different implementations. The /system/systemVersion/buildDate (minOccurs=1 maxOccurs=1) element defines the date and time that the .NET My Services system was built, in UTC (Z-relative) form. The /system/systemVersion/buildDetails (minOccurs=1 maxOccurs=1) /system/systemVersion/buildDetails/@machine (minOccurs=1 maxOccurs=1) attribute specifies the machine that generated the build. The /system/systemVersion/buildDetails/@type (minOccurs=1 maxOccurs=1) attribute specifies the type of build. A value of chk indicates that this is a checked or debug build. A value of fre indicates that this is a retail build.

The /system/systemVersion/buildDetails/(branch (minOccurs=1 maxOccurs=1) attribute specifies the software branch ID for the source code that contributed to this build. The /system/systemVersion/buildDetails/@official (minOccurs=1 maxOccurs=1) attribute indicates whether the build was produced by an official build process (value of yes), or an unofficial process (value of no).

The /system/roleMap (minOccurs=1 maxOccurs=1) /system/roleMap/@changeNumber (minOccurs=1 maxOccurs=1)/system/roleMap/@id (minOccurs=1 maxOccurs=1)/system/roleMap/scope (minOccurs=0 maxOccurs=unbounded) element defines a scope which may be referred to by roles within this roleMap to indicate what portions of the document are visible to this role for the specified method, along with the /system/roleMap/scope/@id (minOccurs=0 maxOccurs=1)/system/roleMap/scope/name (minOccurs=0 maxOccurs=unbounded) elements.

The /system/roleMap/scope/name/@xml:lang (minOccurs=1 maxOccurs=1) required attribute is used to specify a language code compliant with RFC 3066 as described in RFC 3066; more information is available from the W3C. If the language code is unknown, a value of "und" should be used, as per RFC 3066. Applications are expected to undertake a reasonable effort to determine the input language and store it with the data. Applications should preserve a previously set xml:lang attribute in cases in which the string itself in not changed by the application.

The /system/roleMap/scope/name/@dir (minOccurs=0 maxOccurs=1) optional attribute specifies the default layout direction for the localized string. Valid values are rtl (right to left) and ltr (left to right). The /system/roleMap/scope/shape (minOccurs=1 maxOccurs=1)/system/roleMap/scope/shape/@base (minOccurs=0 maxOccurs=1) attribute specifies the initial set of nodes visible through the shape. A value of t indicates that the shape is initialized to include all possible nodes relative to the shape that is currently in effect. For instance, each role defines a scope containing a shape. When defining a shape for a role, the value t indicates all possible nodes available in the specified document for this role. When defining a shape in an ACL entry, a value of t means all of the nodes visible in the shape for the computed role. When using a shape in an hsdl operation, a value of t indicates all of the possible nodes selected by the hsdl operation (relative to the ACL shape which itself is relative to the role's shape). The value nil indicates the opposite of t, which is the empty node set. Nodes from this set may then be included into the shape.

The /system/roleMap/scope/shape/include (minOccurs=0 maxOccurs=unbounded) element specifies the set of nodes that should be included into the shape relative to the possible set of nodes indicated by the base attribute. The /system/roleMap/scope/shape/include/@select (minOccurs=1 maxOccurs=1) /system/roleMap/scope/shape/exclude (minOccurs=0 maxOccurs=unbounded) element specifies the set of nodes that should be excluded from the shape relative to the possible set of nodes indicated by the base attribute. The /system/roleMap/scope/shape/exclude/@select (minOccurs=1 maxOccurs=1)/system/roleMap/roleTemplate (minOccurs=0 maxOccurs=unbounded) element encapsulates the definition of a role. The attribute set for this element includes the document class that this roleTemplate refers to, the name of the roleTemplate, and the priority of the roleTemplate.

The /system/roleMap/roleTemplate/@name (minOccurs=1 maxOccurs=1) element specifies the name of the role. The /system/roleMap/roleTemplate/fullDescription (minOccurs=0 maxOccurs=1) element contains a description of this roleTemplate that specifies the capabilities a caller will have when accessing information through this role. The /system/roleMap/roleTemplate/fullDescription/@xml: lang (minOccurs=1 maxOccurs=1) required attribute is used to specify a language code compliant with RFC 3066 as described in RFC 3066; more information is available from the W3C. If the language code is unknown, a value of "und" should be used, as per RFC 3066. Applications are expected to undertake a reasonable effort to determine the input language and store it with the data. Applications should preserve a previously set xml:lang attribute in cases in which the string itself in not changed by the application. The /system/roleMap/roleTemplate/fullDescription/@dir (minOccurs=0 maxOccurs=1) optional attribute specifies the default layout direction for the localized string. Valid values are rtl (right to left) and ltr (left to right).

The /system/roleMap/roleTemplate/method (minOccurs=0 maxOccurs=unbounded) element specifies the methods available within this roleTemplate by name and by scope. When a subject maps to a roleTemplate, the method in the request must match one of these elements for the message to continue to flow. If the method exists, the data available to the method is a function of the scope referenced by this method, combined with an optional scope referenced by the role defined in the roleList. The /system/roleMap/roleTemplate/method/@name (minOccurs=1 maxOccurs=1) element specifies the name of the method. The /system/roleMap/roleTemplate/method/@scopeRef (minOccurs=1 maxOccurs=1) attribute specifies the scope within this document that is in effect for this method.

The /system/methodMap (minOccurs=1 maxOccurs=1) /system/methodMap/@changeNumber (minOccurs=1 maxOccurs=1) /system/methodMap/@id (minOccurs=1 maxOccurs=1)/system/methodMap/method (minOccurs=0 axOccurs=unbounded) fields provide method-related data. The /system/methodMap/method/(name (minOccurs=1 maxOccurs=1) attribute specifies the name of a method available within this service. The /system/methodMap/method/{any} (minOccurs=0 maxOccurs=unbounded) provides for extensibility.

The /system/schemaMap (minOccurs=maxOccurs=1) /system/schemaMap/@changeNumber (minOccurs=maxOccurs=1) /system/schemaMap/@id (minOccurs=1 maxOccurs=1)/system/schemaMap/schema (minOccurs=0 maxOccurs=unbounded) provide schema map data. The /system/schemaMap/schema/@namespace (minOccurs=1 maxOccurs=1) attribute specifies the namespace URI of this schema. The /system/schemaMap/schema/@schemaLocation (minOccurs=1 maxOccurs=1) attribute specifies the location (in the form of a URI) of the resource containing the schema. When a schema is reachable through a variety of URIs, one schema element will exist for each location. The /system/schemaMap/schema/@alias (minOccurs=1 maxOccurs=1) attribute specifies the preferred alias to be used, if possible, when manipulating information covered by this schema in the context of this service. The /system/schemaMap/schema/{any} (minOccurs=0 maxOccurs=unbounded)/system/wsdlMap (minOccurs=1 maxOccurs=1)/system/wsdlMap/@changeNumber (minOccurs=1 maxOccurs=1)/system/wsdlMap/@id (minOccurs=1 maxOccurs=1) provide WSDL-related data. The /system/wsdlMap/wsdl (minOccurs=0 maxOccurs=unbounded) element is used to specify the location of a WSDL file for this service. Multiple entries may exist pointing to the same file hosted in multiple locations, or to variations on the content within the WSDL files. The /system/wsdlMap/wsdl/@wsdlLocation (minOccurs=1 maxOccurs=1) attribute is a URI that specifies the location of the WSDL file. The /system/wsdlMap/wsdl/{any} (minOccurs=0 maxOccurs=unbounded) provides for extensibility.

The /system/wsdlMap/disco (minOccurs=0 maxOccurs=unbounded) element is used to specify the location of a DISCO file for this service. Multiple entries may exist pointing to the same file hosted in multiple locations, or to variations on the content within the DISCO files. The /system/wsdlMap/disco/@discoLocation (minOccurs=1 maxOccurs=1) attribute is a URI that specifies the location of the DISCO file. The /system/wsdlMap/disco/{any} (minOccurs=0 maxOccurs=unbounded) provides for extensibility.

The /system/wsdlMap/wsil (minOccurs=0 maxOccurs=unbounded) element is used to specify the location of a WSIL file for this service. Multiple entries may exist pointing to the same file hosted in multiple locations, or to variations on the content within the WSIL files. The /system/wsdlMap/wsil/@wsilLocation (minOccurs=1 maxOccurs=1) attribute is a URI that specifies the location of the WSIL file. The /system/wsdlMap/wsil/{any} (minOccurs=0 maxOccurs=unbounded)/system/{any} (minOccurs=0 maxOccurs=unbounded) field provides for extensibility.

.NET Notifications (myNotification)—/Methods

The myNotifications service supports the standard methods as described in the aforementioned U.S. patent application Ser. No. 10/017,680.

.NET DEVICES (myDevices)

The Microsoft® .NET Devices (myDevices) service stores characteristics of a user's devices to inform an information agent service about the nature, abilities and appropriateness for transmitting and rendering information of different content and in different contexts. Such a service can store device characteristics with the carriers that provision those devices. This service is designed primarily to be used in conjunction with the other Microsoft .NET Services, allowing data, such as notifications or documents, to be delivered to devices on various transports in a customized manner. For example, the use of the myDevices schema and service is described below with respect to receiving notifications.

The myDevices service controls access by using some or all of the roleTemplates and scopes set forth above with reference to .NET notifications.

The .NET devices (also known as myDevices) web service is a centralized store for attributes of .NET-compatible computing devices associated with a single (e.g., user) identity. The .NET Devices service is designed to store a combination of characteristics about devices, including mobile communication devices, along with data on any carriers that provision those devices. This service is primarily designed to allow notifications, messages and other real-time communications to be delivered to a wide variety of devices on various transports. By providing this service, applications, web sites and other third party services can easily query the list and capabilities of registered computers, cell phones, PDAs, and so on associated with an individual. Such elements as device screen size, screen color depth, input methods, processor type, back-channel and confirmation ability, are stored and can be queried by any allowed service.

By providing for this centralized store, applications can easily query the native capabilities of devices associated with an individual and make intelligent decisions around shaping content or notifications specifically for the unique attributes of a specific device. They can do this even if the device is inaccessible, turned off, or transiently connected to the Internet.

The .Net Devices service and schema provide cross-referencing of a globally unique device identification number throughout the other .NET services, such as the electronic end point for email messages, notifications or presence information. In addition, the globally unique device ID number may be the same as used by the Universal Plug and Play forum (http://www.upnp.org), so as to provide interoperability with other UPnP devices. The present invention also provides a "last known good" state of the current device state, as stored on the central server, even if the device is turned off, and provides key information about how the device is actually being used at the current moment for other high value .NET services, such as the myNotifications service. The present invention further provides a central point of administration for all devices associated with a person, easily enabling them to add, delete or change ownership of devices (such as when selling an AutoPC-equipped car), and provides an extensibility mechanism so that third parties can decorate the schema with additional elements unique to their specific circumstances, such as adding a variety of cellular network-specific attributes to a cell phone device.

For example, consider a user purchasing a new .NET-aware cell phone. When first activated and a Passport ID (PUID) entered, the device asks whether to register the phone with the user's Personal.NET service. If affirmative, the phone dumps its current physical attributes (screen size, network transports, etc) to the central myDevices Service. This device then appears as one of possibly many devices in the device administration web page associated with the user's identity. The user can then grant or deny access to the information about that device via the various .NET roles the user may have previously created ("Friend", "Family", "Business Colleague", and so forth).

Once a user's devices are registered, if a website or the like needs to send that user an important email message, and has decided that the user is likely to quickly get the message on the cell phone, the website server queries the central myDevices service and looks up the physical attributes of the cell phone (assuming it has the necessary permissions). The website may now formulate an HTML-based email message specifically tailored to the physical attributes of that device, e.g., to be delivered by the primary SMTP transport as listed for that device via the myPresence .NET service (e.g., the electronic end point as listed for the SMTP transport). If the cell phone was out of network range, or turned off, then the email message may be queued for later delivery by the network transport of that device.

Alternatively, and as described below, the following may scenario happen when the website wants to send the user an important email message. The information agent service 504 (.NET notification server) 504 may query the myDevices service 306 to learn which items will help it in the intelligent routing of time-critical notifications to a most-likely-to-be seen or heard device. One of these may include the most recent timestamp associated with each device schema. This, combined with other context information (such as the current list of events in the user's .NET Schedule/Calendar service 303 can indicate which device is (or devices are) most likely to be online and accessible at the moment. Another of these items may include a currently preferred alert mode (flash, vibrate, buzz, chirp or the like) for when notifications land on the device, for the appropriate formatting of the content. Although the device will generally be the final decision authority on how and when notifications will be displayed, it is of great use if the notifications service knows in advance of notification delivery to make informed decisions on the best way to shape and route the notification. Also, users may configure their notification preferences and/or devices so as to abide by recommendations about the best alerting per context and content transmitted in the notification schema as composed by the information source or the user's information-agent service.

Yet another valuable item to know is the current network transport bandwidth. This will help determine whether to route large email messages or attachments (e.g., pictures) to that device. With some or all of the desired information, the .NET notification service then generates an appropriately formatted real-time notification message based upon the above inputs and sends it along to the device via the electronic end point transports, e.g., as listed in the myPresence service.

.NETDevices(myDevices)—/Content

The .NET Devices (myDevices) content document is an identity-centered document. Its content and meaning are a function of the Passport Unique ID (PUID) used to address the service. Access to the document is controlled by the associated roleList document. The following schema outline illustrates the layout and meaning of the information found in the content document for the myDevices service:

```
<m:myDevices changeNumber="..." instanceId="..."
  xmlns:m="http://schemas.microsoft.com/hs/2002/04/myDevices"
  xmlns:hs="http://schemas.microsoft.com/hs/2002/04/core">$_{1..1}$
  <m:device changeNumber="..." id="...">$_{0..unbounded}$
    <m:cat ref="...">$_{0..unbounded}$</m:cat>
    <m:deviceId>$_{1..1}$</m:deviceId>
    <m:carrierId>$_{1..1}$</m:carrierId>
    <m:name xml:lang="..." dir="...">$_{1..1}$</m:name>
    <m:address>$_{0..unbounded}$</m:address>
```

```
    {any}
  </m:device>
  <m:subscription changeNumber="..." id="...">_{0..unbounded}
    <hs:trigger mode="..." baseChangeNumber="..." select="...">_{1..1}
    </hs:trigger>
    <hs:expiresAt>_{0..1}</hs:expiresAt>
    <hs:context uri="...">_{1..1} {any}</hs:context>
    <hs:to>_{1..1}</hs:to>
  </m:subscription>
  {any}
</m:myDevices>
```

The meaning of the attributes and elements shown in the preceding sample document fragment are listed in the following section. The /myDevices (minOccurs=1 maxOccurs=1) element encapsulates the content document for the Microsoft® .NET Devices service. The /myDevices/@changeNumber (minOccurs=1 maxOccurs=1)/myDevices/@instanceId (minOccurs=0 maxOccurs=1)/myDevices/device (minOccurs=0 maxOccurs=unbounded) /myDevices/device/@changeNumber (minOccurs=1 maxOccurs=1)/myDevices/device/@id (minOccurs=1 maxOccurs=1)/myDevices/device/cat (minOccurs=0 maxOccurs=unbounded) provide various details of the device. The /myDevices/device/cat/@ref (minOccurs=1 maxOccurs=1) attribute references a category definition (catDef) element using the rules outlined in the .NET Categories (myCategories) section of the aforementioned U.S. patent application Ser. No. 10/017,680.

The /myDevices/device/deviceId (minOccurs=1 maxOccurs=1) element contains the device name/ID in URI form. This element is encoded as a URI to allow richer and more extensible naming for the device than can be expressed using a simple UUID. In one implementation, the URI name will be of the form http://mydevices.microsoft.com/carrierID/deviceID#9c20f0e8-c0ef-472d-8bec-4cc6f8b0f456.

The /myDevices/device/carrierId (minOccurs=1 maxOccurs=1) element contains the URI of the carrier that is responsible for servicing this device. The element is encoded as a URI, which allows for both UUID-based carrier identification and richer identification mechanisms. The /myDevices/device/name (minOccurs=1 maxOccurs=1) element contains a user-readable, non-unique friendly name for the device.

The /myDevices/device/name/@xml:lang (minOccurs=1 maxOccurs=1) required attribute is used to specify a language code compliant with RFC 3066 as described in RFC 3066; more information is available from the W3C. If the language code is unknown, a value of "und" should be used, as per RFC 3066. Applications are expected to undertake reasonable effort to determine the input language and store it with the data. Applications should preserve a previously set xml:lang attribute in cases in which the string itself in not changed by the application.

The /myDevices/device/name/@dir (minOccurs=0 maxOccurs=1) optional attribute specifies the default layout direction for the localized string. Valid values are rtl (right to left) and ltr (left to right). The /myDevices/device/address (minOccurs=0 maxOccurs=unbounded) element contains addresses in the form of URIs that can be used to address this device. For example, if the device is addressable through e-mail, an address entry of "mailto:someone@microsoft.com" may appear in this element. If the device is also addressable through an HTTP gateway, an additional address of "http://microsoft.com/somepath/someid" can be specified in this element. This element is repeated for each address that can be used to address the device. The /myDevices/device/{any} (minOccurs=0 maxOccurs=unbounded) field allows for extensibility.

The /myDevices/subscription (minOccurs=0 maxOccurs=unbounded) /myDevices/subscription/@changeNumber (minOccurs=1 maxOccurs=1) /myDevices/subscription/@id (minOccurs=1 maxOccurs=1)/myDevices/subscription/trigger (minOccurs=1 maxOccurs=1) fields are directed to subscription-related data. The /myDevices/subscription/trigger/(mode (minOccurs=1 maxOccurs=1) attribute specifies whether the content of the changes that triggered the subscription are delivered in the subscription message, or the message simply indicates that something changed under the trigger. The attribute may be includeData, wherein the data that changed, causing the subscription to trigger, is included in the subscription message. Note that deleted nodes are specified by their ID, not by value. The attribute also may be excludeData, wherein the data that changed, causing the subscription to trigger, is not included in the subscription message.

The /myDevices/subscription/trigger/@baseChangeNumber (minOccurs=0 maxOccurs=1) attribute specifies the changeNumber value to which the trigger relates. Changes between the specified change number and the current state of the document relative to the selection are transmitted as subscription messages. This allows a client application to establish a subscription relative to some baseline. As with changeQuery, if the baseChangeNumber is way out of date relative to the current state of the document, and the service can not supply the changes in the subscription message, the subscription insert is rejected. A value of zero means that the current values of the selected nodes are transmitted in the subscription message.

The /myDevices/subscription/trigger/@select (minOccurs=1 maxOccurs=1) item specifies an XPath expression that specifies the nodes that are to be selected and watched for changes. The selection may select only xdb:blue nodes. As changes in this node set occur, they trigger the generation of subscription messages. These messages are then sent to the SOAP receiver listed in the "to" element.

The /myDevices/subscription/expiresAt (minOccurs=0 maxOccurs=1) optional element specifies an absolute time after which the subscription is no longer active. The subscription node is automatically removed when the subscription expires. If this element is missing, the subscription does not expire. The /myDevices/subscription/context (minOccurs=1 maxOccurs=1) element returns the context element from the original subscription. Applications should use this element (and only this element) to correlate the subscription response with one of their subscriptions. The /myDevices/subscription/context/@uri (minOccurs=1 maxOccurs=1) attribute specifies the URI value chosen by the subscriber that is associated with this subscription. The /myDevices/subscription/context/{ any} (minOccurs=0 maxOccurs=unbounded) provides built-in extensibility.

The /myDevices/subscription/to (minOccurs=1 maxOccurs=1) attribute specifies the location that is to receive the subscription message. The value of this element may be one of the following forms:

hs:myAlerts—This URI indicates that generated subscription messages are to be delivered inside the body of a notification and delivered to the default .NET Alerts service of the creator.

protocol://service—This URI indicates that generated subscription messages are delivered to the specified service at the domain of the creator's platformId. For instance, a platformId indicating contoso.com, and a value in this element of http://subscriptionResponse, would cause delivery of the subscription message to http://subscriptionResponse.contoso.com.

If this value is not specified, the subscription message is delivered as a notification to the "creator's" .NET Alerts service. The /myDevices/{any} (minOccurs=0 maxOccurs=unbounded) field provides for extensibility.

.NET Devices—System

The system document is a global document for the service. Its content and meaning are independent of the Passport Unique ID (PUID) used to address the service, and the document is read only to all users. The system document contains a set of base items common to all .NET My Services, and is optionally extended by each service to include service-specific global information.

This schema outline illustrates the layout and meaning of the information found in the system document for the myDevices service.

```
<sys:system changeNumber="..." instanceId="..."
    xmlns:hs="http://schemas.microsoft.com/hs/2002/04/core"
    xmlns:sys="http://schemas.microsoft.com/hs/2002/04/myDevices/
    system">1..1
    <hs:systemVersion changeNumber="..." id="...">1..1
        <hs:version minorVersion="..." majorVersion="..." qfe="..."
        buildNumber="...">1..1
            <hs:productReleaseName>1..1</hs:productReleaseName>
            <hs:productImplementationName>1..1
            </hs:productImplementationName>
        </hs:version>
        <hs:buildDate>1..1</hs:buildDate>
        <hs:buildDetails machine="..." type="..." branch="..."
official="...">1..1</hs:buildDetails>
    </hs:systemVersion>
    <hs:roleMap changeNumber="..." id="...">1..1
        <hs:scope id="...">0..unbounded
            <hs:name xml:lang="..." dir="...">0..unbounded</hs:name>
            <hs:shape base="...">1..1
                <hs:include select="...">0..unbounded</hs:include>
                <hs:exclude select="...">0..unbounded</hs:exclude>
            </hs:shape>
        </hs:scope>
        <hs:roleTemplate name="...">0..unbounded
            <hs:fullDescription xml:lang="..." dir="...">0..1
            </hs:fullDescription>
            <hs:method name="..." scopeRef="...">0..unbounded</hs:method>
        </hs:roleTemplate>
    </hs:roleMap>
    <hs:methodMap changeNumber="..." id="...">1..1
        <hs:method name="...">0..unbounded {any}</hs:method>
    </hs:methodMap>
    <hs:schemaMap changeNumber="..." id="...">1..1
        <hs:schema namespace="..." schemaLocation="..."
        alias="...">0..unbounded
{any}</hs:schema>
    </hs:schemaMap>
    <hs:wsdlMap changeNumber="..." id="...">1..1
        <hs:wsdl wsdlLocation="...">0..unbounded {any}</hs:wsdl>
        <hs:disco discoLocation="...">0..unbounded {any}</hs:disco>
        <hs:wsil wsilLocation="...">0..unbounded {any}</hs:wsil>
    </hs:wsdlMap>
    {any}
</sys:system>
```

The meaning of the attributes and elements shown in the preceding sample document fragment are listed below. The /system (minOccurs=1 maxOccurs=1) element encapsulates the system document for the Microsoft® .NET Notifications service. The /system/@changeNumber (minOccurs=1 maxOccurs=1)/system/@instanceId (minOccurs=0 maxOccurs=1)/system/systemVersion (minOccurs=maxOccurs=1) /system/systemVersion/@changeNumber (minOccurs=1 maxOccurs=1) /system/systemVersion/@id (minOccurs=1 maxOccurs=1)/system/systemVersion/version (minOccurs=1 maxOccurs=1),/system/systemVersion/version/ @minorVersion (minOccurs=1 maxOccurs=1) attributes identify the system and version information of the .NET service.

The /system/systemVersion/version/@majorVersion (minOccurs=1 maxOccurs=1) attribute specifies the major version number of the .NET service, while the /system/systemVersion/version/@qfe (minOccurs=1 maxOccurs=1) attribute specifies the quick-fix engineering (QFE) version number of the .NET service. The /system/systemVersion/version/@buildNumber (minOccurs=1 maxOccurs=1) attribute specifies the build number of the .NET service. The /system/systemVersion/version/productReleaseName (minOccurs=1 maxOccurs=1) element defines the major product release string (for example, ".NET My Services Beta 1".)

The /system/systemVersion/version/productImplementationName (minOccurs=1 maxOccurs=1) element defines the class of the service to differentiate between different implementations. The /system/systemVersion/buildDate (minOccurs=1 maxOccurs=1) element defines the date and time that the .NET My Services system was built, in UTC (Z-relative) form. The /system/systemVersion/buildDetails (minOccurs=1 maxOccurs=1) /system/systemVersion/buildDetails/ @machine (minOccurs=1 maxOccurs=1) attribute specifies the machine that generated the build. The /system/systemVersion/buildDetails/@type (minOccurs=1 maxOccurs=1) attribute specifies the type of build. A value of chk indicates that this is a checked or debug build. A value of fre indicates that this is a retail build.

The /system/systemVersion/buildDetails/@branch (minOccurs=1 maxOccurs=1) attribute specifies the software branch ID for the source code that contributed to this build. The /system/systemVersion/buildDetails/@official (minOccurs=1 maxOccurs=1) attribute indicates whether the build was produced by an official build process (value of yes), or an unofficial process (value of no).

The /system/roleMap (minOccurs=1 maxOccurs=1) /system/roleMap/@changeNumber (minOccurs=1 maxOccurs=1)/system/roleMap/@id (minOccurs=1 maxOccurs=1)/system/roleMap/scope (minOccurs=0 maxOccurs=unbounded) element defines a scope which may be referred to by roles within this roleMap to indicate what portions of the document are visible to this role for the specified method, along with the /system/roleMap/scope/@id (minOccurs=0 maxOccurs=1)/system/roleMap/scope/name (minOccurs=0 maxOccurs=unbounded) elements.

The /system/roleMap/scope/name/@xml:lang (minOccurs=1 maxOccurs=1) required attribute is used to specify a language code compliant with RFC 3066 as described in RFC 3066; more information is available from the W3C. If the language code is unknown, a value of "und" should be used, as per RFC 3066. Applications are expected to undertake a reasonable effort to determine the input language and store it with the data. Applications should preserve a previously set xml:lang attribute in cases in which the string itself in not changed by the application.

The /system/roleMap/scope/name/@dir (minOccurs=0 maxOccurs=1) optional attribute specifies the default layout direction for the localized string. Valid values are rtl (right to left) and ltr (left to right). The /system/roleMap/scope/shape (minOccurs=1 maxOccurs=1)/system/roleMap/scope/shape/ @base (minOccurs=0 maxOccurs=1) attribute specifies the initial set of nodes visible through the shape. A value of t indicates that the shape is initialized to include all possible nodes relative to the shape that is currently in effect. For instance, each role defines a scope containing a shape. When defining a shape for a role, the value t indicates all possible nodes available in the specified document for this role. When defining a shape in an ACL entry, a value of t means all of the nodes visible in the shape for the computed role. When using a shape in an hsdl operation, a value of t indicates all of the possible nodes selected by the hsdl operation (relative to the ACL shape which itself is relative to the role's shape). The value nil indicates the opposite of t, which is the empty node set. Nodes from this set may then be included into the shape.

The /system/roleMap/scope/shape/include (minOccurs=0 maxOccurs=unbounded) element specifies the set of nodes that should be included into the shape relative to the possible set of nodes indicated by the base attribute. The /system/roleMap/scope/shape/include/@select (minOccurs=1 maxOccurs=1) /system/roleMap/scope/shape/exclude (minOccurs=0 maxOccurs=unbounded) element specifies the set of nodes that should be excluded from the shape relative to the possible set of nodes indicated by the base attribute. The /system/roleMap/scope/shape/exclude/@select (minOccurs=1 maxOccurs=1)/system/roleMap/roleTemplate (minOccurs=0 maxOccurs=unbounded) element encapsulates the definition of a role. The attribute set for this element includes the document class that this roleTemplate refers to, the name of the roleTemplate, and the priority of the roleTemplate.

The /system/roleMap/roleTemplate/@name (minOccurs=1 maxOccurs=1) element specifies the name of the role. The /system/roleMap/roleTemplate/fullDescription (minOccurs=0 maxOccurs=1) element contains a description of this roleTemplate that specifies the capabilities a caller will have when accessing information through this role. The /system/roleMap/roleTemplate/fullDescription/@xml: lang (minOccurs=1 maxOccurs=1) required attribute is used to specify a language code compliant with RFC 3066 as described in RFC 3066; more information is available from the W3C. If the language code is unknown, a value of "und" should be used, as per RFC 3066. Applications are expected to undertake a reasonable effort to determine the input language and store it with the data. Applications should preserve a previously set xml:lang attribute in cases in which the string itself in not changed by the application. The /system/roleMap/roleTemplate/fullDescription/@dir (minOccurs=0 maxOccurs=1) optional attribute specifies the default layout direction for the localized string. Valid values are rtl (right to left) and ltr (left to right).

The /system/roleMap/roleTemplate/method (minOccurs=0 maxOccurs=unbounded) element specifies the methods available within this roleTemplate by name and by scope. When a subject maps to a roleTemplate, the method in the request must match one of these elements for the message to continue to flow. If the method exists, the data available to the method is a function of the scope referenced by this method, combined with an optional scope referenced by the role defined in the roleList. The /system/roleMap/roleTemplate/method/@name (minOccurs=1 maxOccurs=1) element specifies the name of the method. The /system/roleMap/roleTemplate/method/@scopeRef (minOccurs=1 maxOccurs=1) attribute specifies the scope within this document that is in effect for this method.

The /system/methodMap (minOccurs=1 maxOccurs=1) /system/methodMap/@changeNumber (minOccurs=1 maxOccurs=1) /system/methodMap/@id (minOccurs=1 maxOccurs=1)/system/methodMap/method (minOccurs=0 axOccurs=unbounded) fields provide method-related data. The /system/methodMap/method/@name (minOccurs=1 maxOccurs=1) attribute specifies the name of a method available within this service. The /system/methodMap/method/{any} (minOccurs=0 maxOccurs=unbounded) provides for extensibility The /system/schemaMap (minOccurs=1 maxOccurs=1) /system/schemaMap/@changeNumber (minOccurs=1 maxOccurs=1) /system/schemaMap/@id (minOccurs=1 maxOccurs=1)/system/schemaMap/schema (minOccurs=0 maxOccurs=unbounded) provide schema map data. The /system/schemaMap/schema/@namespace (minOccurs=1 maxOccurs=1) attribute specifies the namespace URI of this schema. The /system/schemaMap/schema/@schemaLocation (minOccurs=1 maxOccurs=1) attribute specifies the location (in the form of a URI) of the resource containing the schema. When a schema is reachable through a variety of URIs, one schema element will exist for each location. The /system/schemaMap/schema/@alias (minOccurs=1 maxOccurs=1) attribute specifies the preferred alias to be used, if possible, when manipulating information covered by this schema in the context of this service. The /system/schemaMap/schema/{any} (minOccurs=0 maxOccurs=unbounded)/system/wsdlMap (minOccurs=1 maxOccurs=1)/system/wsdlMap/@changeNumber (minOccurs=1 maxOccurs=1)/system/wsdlMap/@id (minOccurs=1 maxOccurs=1) provide WSDL-related data. The /system/wsdlMap/wsdl (minOccurs=0 maxOccurs=unbounded) element is used to specify the location of a WSDL file for this service. Multiple entries may exist pointing to the same file hosted in multiple locations, or to variations on the content within the WSDL files. The /system/wsdlMap/wsdl/@wsdlLocation (minOccurs=1 maxOccurs=1) attribute is a URI that specifies the location of the WSDL file. The /system/wsdlMap/wsdl/{any} (minOccurs=0 maxOccurs=unbounded) provides for extensibility.

The /system/wsdlMap/disco (minOccurs=0 maxOccurs=unbounded) element is used to specify the location of a DISCO file for this service. Multiple entries may exist pointing to the same file hosted in multiple locations, or to variations on the content within the DISCO files. The /system/wsdlMap/disco/@discoLocation (minOccurs=1 maxOccurs=1) attribute is a URI that specifies the location of the DISCO file. The /system/wsdlMap/disco/{any} (minOccurs=0 maxOccurs=unbounded) provides for extensibility.

The /system/wsdlMap/wsil (minOccurs=0 maxOccurs=unbounded) element is used to specify the location of a WSIL file for this service. Multiple entries may exist pointing to the same file hosted in multiple locations, or to variations on the content within the WSIL files. The /system/wsdlMap/wsil/@wsilLocation (minOccurs=1 maxOccurs=1) attribute is a URI that specifies the location of the WSIL file. The /system/wsdlMap/wsil/{any} (minOccurs=0 maxOccurs=unbounded)/system/{any} (minOccurs=0 maxOccurs=unbounded) field provides for extensibility.

.NET Devices (myDevices)—Methods

The myDevices service supports the standard methods as described in the aforementioned U.S. patent application Ser. No. 10/017,680.

Notification Platform

In general, the present invention provides a method and system for using various schemas and services to provide regularized notification handling, and provide an opportunity for user control and normalization of the operation of policies across different information types and contexts. The information-service schemas and services are combined to build a valuable, general purpose content-sensitive and context-sensitive information service that provides a notification platform. In general, via the notification platform, information services communicate information to recipient devices of users that subscribe to those services, by formatting the information according to defined schemas. Information sources include e-mail providers, voice-mail providers, online auction services, news services, financial services, new classes of automated agent-based services such as automated scheduling and travel assistance, and so forth. Recipient devices include cellular telephones, pagers, personal computers, personal digital assistants, and the like.

FIG. 5 represents a notification platform 500 constructed in accordance with an aspect of the present invention. In general, a number of information sources $502_1$-$502_m$ feed notification information to an information agent service 504, such as a service having an information agent instance per subscriber. In keeping with the present invention, the notifications are regularized via information encoded in a defined notification schema 506, and, for example, notification information is sent in an XML-formatted document fragment based on the schema. Note that the information sources may be arranged with internal user preference filtering or the like, so as to only selectively send notifications to subscribers. For example, an information source that updates a user on a stock price only sends a notification with a stock's price data at the market close, or when a stock changes by more than x percent, so that the information sources do not flood the information agent service 504 by sending unwanted notifications too frequently. For encoding preferences at sources, a standardized format (e.g., schema) for source preferences and device preferences may be used, as described below and as represented in FIG. 5 by source preference schemas $503_1$-$503_n$.

The notification schema 506 represents metadata about the subscription of a service to a source of information, as well as representing details about that information, including the nature, importance, time criticality or urgency of information, disposition over time of information provided by a message, and message handling preferences. An example of how a notification schema may be arranged and the information that may be represented thereby is represented in TABLE 1A below:

TABLE 1A

Notification Schema

Header
Information identity: service, class, title (uuid), trackingID, author (incl. on behalf info),
author-type (person vs. agent)
Creation time
    Birth time: time indicated by author birth time for message, taken as the initial time, $t_o$.
    Service receipt time: time received by notification service
Subscription path
    Sources subscription operations path (details on subscribing and unsubscribing)
    Source logo and graphics path (source logo and graphics information)
    Source preference path
    Administrative contact
Privacy and authorization
    Authorizations for reading and writing to fields by proxies, people, groups
Transmission history (delays before transmission, prior attempts and times, where in
processing chain is message)
Reliability and confirmation
    Confirmation requirement
        Actions on failure type x
            Journal on condition
            Re-route on condition
            Confirmation policy
Body
Content components
    Content access
        Embedded
        Ptr (url)
    Content properties
        Text, properties
        Graphics, properties
        Audiovisual, properties
        UI content and controls
Device preferences / hints
Bandwidth requirements
    To/from device
Media rendering requirements
    uri
    Text, graphics (x,y), audio, etc.
User interaction requirements
    Device genre
        Small screen with functions { }
        Rich client
    User input capabilities
        Special inputs
        Text input- full keyboard, alternate
        Cursor control
        Speech
        Audio
        Videocapture
    Client UI components
        Local UI code and interfaces
        e.g., Windows ® client modules, API TABLE 1A-continued Notification Schema Backchannel and relay requirements
    External messaging backchannel
        Backchannel properties
        Confirmation abilities
            Local receipt
            User confirmation
        Device context status
            e.g., In use, in motion, app status, activity status, last use
        Local relay for platform services
            APIs to local client services
                Classes
Routing and alerting hints
  Delivery Routing
    Single Device
    Device Set: { }
    Device Sequence until confirmation: { }
  Allow for conditioning on context and content
        Condition 1
            Device x
        Condition 2
            Device sequence: { }
        Condition n
            Device Set: { }
  Delivery Timing
    Best Effort
    Deliver by t
      Action on Fail
    Bounded deferral t
        Conditions t:
        Conditions flow <t: { }
        Conditions hold <t: { }
    Other prototypical policies
  Local Delivery Timing (Device x)
    Best Effort
    Deliver by t
      Action on Fail
    Bounded deferral t
        Conditions t:
        Conditions flow <t: { }
        Conditions hold <t: { }
    Other prototypical policies
Device-specific hints
    Device policy (alerting, timing, fidelity tradeoffs, UI, store): Device i
        Conditional policies
            Condition 1
              Policy 1
            Condition 2
              Policy 2
                .
            Condition n
              Policy n
Information Value
Capture core notion of discrete or scalar value of importance and/or urgency. Taken as
a core representation of information value for notification systems "urgency" of
messaging or communication.
        Basic
          Discrete: High, Normal, Low
          Scalar: Range: Low..High [1 ..100]
        Extended
          Function type, parameters
        Linear (initial value, rate of loss)
            Deadline, (initial value, total loss at time t)
            Exp, (initial value, half-life
            Sigmoid, (initial value, parameters)
            Step, (initial value, loss steps by time)
            Complex (provide), e.g., Shelf, shelf-life + function/parameter
            Other (parameters)
        Conditional value
          Condition 1
             Value: { }
          Condition 2
             Value: { }
              .
              .
          Condition n
             Value: { }
Information Volatility

TABLE 1A-continued

Notification Schema

Describes the disposition of the message over time.
    Time to live (TTL) without review: delete after time x
        Action on delete (delete only, log, resend to other user, etc.)
    Time to live (TTL) on device x
        Action on delete (delete only, log, resend to other user, etc.)
    Replace: Replace uuid, class, or thread Id, etc. received most recently
    Replace all: deliver, and delete all of same uuid, class, or thread Id, etc. received earlier
    Thread ID: Append to prior class, title, ID
    Update attribute x in prior title, ID and delete
    Default to delete upon review
    Default to journal upon review
    Other info volatility policies
    :
    Conditional Volatility:
        Condition 1
        .
        .
        Condition n In general, a notification schema should consider allowing routing policies to be written directly into a schema by source processes, versus always relying on a downstream information agent to infer routing policies from attributes of content, urgency and the like. Thus, some direct specification of policy preferences at the source should be enabled, and a notification schema should make it straightforward to encode policy via direct writing of routing preferences and policies into the schema, as hints.

The schema for the notification header may provide notification class, title, and a subscription identifier to identify the notification, and the notification may be stamped with a unique identifier and time. The overall .NET service provides the identity of the caller, application and platform. Other information may describe whether an automated agent or a person generated the notification, information volatility (e.g., Time to live data, replaceability with update, and so forth. Still other header information may specify whether the notification is replaceable with sameTitle, sameClass, and so on.

The schema for notification body provides attributes that detail the type of content in the body, e.g., textOnly, textAudio, textGraphics, AudioGraphics, and so on, and the size of the notification (e.g., in bytes). Notifications can also express their value, for example as scalar numbers, cost amounts, or qualitative tags (high, medium, low), so that the information agent service can determine whether and how to deliver the notification, as described below. Notifications also have the ability to express dynamics of value, that is, how values change over time with delays. Multiple functions are available, including deadline, stepwise, half-life and sigmoid functions.

In the schema, consideration may also be given to a privacy, authority model for writing and reading attributes of metadata to minimize "spamming" via the information agent. To this end, a standard tag for representing authorship of key fields (which fields in the schema, written or overwritten by which author and/or process) may be employed. The notification may thus provide security and authorization, by maintaining a record of who wrote and who can read attributes, as well as authenticating senders. Consideration may also be given to allowing the option of encoding preference information on rendering fidelity tradeoffs, summarization options, subscription information, path to remote-stored preferences, and so forth in the notification schema itself. Also, as with other schemas described herein, a schema should employ required and optional fields to keep header size and processing lightweight. To this end, the use of standardized schemas that are potentially small or compact subsets of the notification schema (and similarly other schemas) may be used to keep messages lightweight relative to complete or extended schemas. Still further, tradeoffs in richness versus the need for header extensions for handling of real-time communications should be considered, as well as informational notifications (e.g., incoming and desired channel).

The notification schema can contain information about preferences for rendering of content in different ways, including preferences for rendering different approximations of the complete content of a message, depending on device capabilities. Content to be rendered can contain multiple components or types of information, e.g., text, HTML, graphics, video, audio, and combinations. To date, content encodings like MIME allow different devices to render a message based on rendering abilities and encoded policies. For a cross-device notification platform, different formulations of content can be encoded and transmitted for different devices. Also, preferences in the notification schema can be encoded to indicate preferences for different devices given the content at hand, and how different devices should best handle the rendering of portions of content, whether the content is of a single or of multiple types of information, based on device capabilities.

Rendering preferences allow for a piece of content to be summarized in different ways depending on the device rendering capabilities. Also, information about the ability to render and the fidelity of rendering may be an important consideration for making decisions about waiting for a device with an ability to render a more complete rendition of the information versus sending an approximate version of the information more immediately. For example, consider that a piece of content has graphics and text, e.g., directions to a location with a map graphic. A cell phone might be available now, but the device might only be able to render text on its small display. If the notification platform waits an hour, a desktop device with the ability to render both graphics and text may become available.

Content can be encoded in different ways for rendering by devices with different capabilities. In one approach, the content contains a distinct formulation for different classes of rendering ability. For example, an extended piece of text, containing more detailed descriptions, might be made available for the situation where the graphic is not available. For devices with text and graphics capability, content containing a shorter text description coupled with a graphic might be made available. Alternatively, a single piece of multipart content may be provided. In such a case, devices make an effort to render portions of the single multipart content that they can render, and drop the other information. Given these different approaches to handling content on different devices, there may be value in encoding preferences about rendering, and, potentially also, encoding different formulations of content that these preferences address. Such preference information can be used in a number of ways. As an example, a notification manager can provide value by reasoning about whether it is better to wait until a richer client is available, versus sending a portion of the content (e.g., directions without a map graphic). In another scenario, different devices may have different costs of usage. A notification manager may have the ability to reason about the informational value versus losses associated with rendering portions or summaries of content, based on the rendering abilities and bandwidth available. Also, a source or user may have different preferences about different subsets and types of renderings on different available devices.

The system is able to use hints per encodings related to matching device capabilities (e.g., fidelity) and rendering tradeoffs stamped by the source into notification schema, to use source preferences, or to follow policies based on a user's preferences about how to render content with multiple components (across media types) when that content cannot be fully rendered.

One way in which this may be accomplished is for the schema information to include preference ordering on approaches to content rendering. Another way is to provide a fidelity measure with each alternative rendering option. By way of example, consider an example of a notification about a traffic jam, containing directions about re-routing the user. The information contains audio on directions, a text description, and a map graphic. In this example, rendering on a device that can handle all three components (without truncation for the text) is assigned a fidelity of 1.0, while a device capable of handling only the map graphic and text is assigned a fidelity of 0.75, and one that can only handle the text is assigned a fidelity of 0.5. These preferences can be encoded as fidelity tags on different rendering types by the source, or can be stored as general policies in the user information preferences that overwrite or reorder the preferences encoded initially in the notification schema by the source.

As described above, several encodings are possible. For example, the source can send separate content blobs and indicate that the order represents the preferences. That is, the first one would be the best, then the next, and so on. Alternatively, each type of rendering set of abilities can be assigned a fidelity value between 0 and 1.0. Such fidelity values can be made content and context dependent. Further, a function may be encoded that captures how the fidelity will change with approximate renderings or the like. For example, the notification schema can contain a description of a functional form of fidelity for text rendering devices that allows fidelity to be assigned to any particular piece of text content, as a function of the portion of text that can be displayed. For example, fidelity can range from 1.0 to 0 as text is truncated from the complete text to truncated (pruned) text, as some function of the fraction of words remaining in the truncated text.

Thus, for each content rendering blob (of data), a fidelity may be listed. For a multipart, multicomponent blob, alternate renderings, each associated with a fidelity value, may be listed. User preferences may be accessed when decisions are made about timing and routing of information.

As an alternative to (or in addition to) being sent as its own message, schematized notification data may be embedded as an overlay on existing messaging and communication systems. For example, notification schema metadata may be included in the header (or hidden in the content) of email. Another example of providing a notification via a communication system includes overlaying the notification metadata on a telephone communication. In general, a schematized notification may accompany any transmission of data, and, as mentioned above, the encoding for the various schema metadata (such as the notification schema metadata) can be in different formats, e.g., the metadata may be encoded in MIME for SMTP (email), in XML for SOAP messages, or SIP, depending on the protocol and application.

Moreover, the development of a standard method for overlaying context-sensitivity and content-sensitivity on any key properties with conditional statements may be implemented, as in the following example:

Conditional Delivery:
    Condition   1: If present at a full-client machine
    .              2: If not present on a full-client machine
    .
    Condition n As can be appreciated, the present invention is not limited to any one notification schema, but rather includes numerous alternatives for any given schema. For example, the outline below describes information that may be used in an alternative notification schema. Note that elements in such a schema may be merged with other relevant elements to assemble a new schema, have other elements added thereto or removed therefrom, and otherwise modified and combined to form a schema. In general, the schemas and/or schema outlines described herein only provide examples of the type of information that may be used in a schema. TABLE 1B provides such an example:

TABLE 1B

```
<myNotifications changeNumder="...">
    <notification
        changeNumber="..."
    uuid="..."
    replace="..."
    threadId="..."
    class="..."
    id="...">0..unbounded
        <identityHeader type="user|automated">
            <senderUserReference/>
```

TABLE 1B-continued

```
            <branding
                    logo="..."
                    alternativeText="..."
            />
            <!-- enable entities to add branding information
                    so that this alert shows through (e.g., an
                    URL to content, alt text, and/or an {any}
                    field.
            -->
        </identityHeader>
        <timeInformation>
                <creationTime>1..1</creationTime>
                <receivedTime>1..1</receivedTime>
        </timeInformation>
        <subscriptionInfo>0..1</subscriptionInfo>[LF1]
        <subscriptionContact>0..unbounded
                <cat ref="...">1..1</cat>
                <email>1..1</email>
                <name>0..1</name>
        </subscriptionContact>
        <transmissionHistory>
                <attemptedDelivery>0..unbounded
                        <time/>1..1
                        {any}
                </attemptedDelivery>
                <routingInfo sequence="...">
                        <!--tracks the hops the notification took to get there--
                        >
                </routingInfo>0..unbounded
                {any}
        </transmissionHistory>
        <!--Reliability and confirmation -->
        <confirmation required="true|false"/>
        <failure type="..."
                policyId="pointer to id">0..unbounded
          <action>
                <journal set="true|false" condition="???"/>0..1
                <reroute set="true|false" condition="???"
                path="someURI"/>0..1
          </action>
        </failure>
        <!-- Body -->
        <title xml:lang="..." dir="..."/>
        <content
                fidelity="percent value indicating how good the content is"
        >
                <url/>
                <contentType/>
                <contentTransferEncoding/>
                <size>
                <rendererLocation>url to rendering
                        tool</rendererLocation>0..1
                <!--   content should also support a pointer to MIME parts
                        need not resend this each time in multiple content
                        blocks
                -->
        <!-- Device preferences
                        Used to help an info agent figure out which piece of
                        content to try to render on which
        -->
        <bandwidth to="..." from="..."/>
        <graphics x="..." y="..." colors="..."/>
        <audio/><!-- need input on what audio req's look like -->
        <userInput
                keyboard="none|full|alternate"
                cursorControl="..."
                speech="none|[name or uri of speech engine"
                audio="..."
                video="..."
        />
        <clientUi path="..."></clientUi>
        {any}
  </content>
<!-- Backchannel and relay requirements -->
        <xsd:element
                name="backChannel"
                type="backChannelType"
                minOccurs="0"
                maxOccurs="1"
```

TABLE 1B-continued

```
            />
<xsd:complexType name="backChannelType">
        <xsd:annotation>
                <xsd:documentation>
                        This element addresses the ability of the endpoint device to
                        send a message back to a component (e.g., the user InfoAgent)
                        that wants to have knowledge that the notification got
                        through.
                </xsd:documentation>
        </xsd:annotation>
        <xsd:sequence>
                <xsd:element
                        name="confirmAbilities"
                        type="hs:string"
                        minOccurs="0"
                        maxOccurs="unbounded"
                >
                        <xsd:annotation>
                                <xsd:documentation>
                                        this elements describes the device's abilities
                                        to confirm of notification delivery and
                                        processing. for example, "onReceive" means
                                        to confirm when the device receives a
                                        notification "onOpen" means to confirm when
                                        a user reviews a notification "explicit": means
                                        to confirm when a user explicitly expresses
                                        the request to confirm e.g. push a button) a
                                        notification (alternatively implement with
                                        enum type of "onReceive", "onOpen",
                                        "explicit", "onReceive+onOpen",
                                        "onReceive+explicit", "onOpen+explicit",
                                        "onReceive+onOpen+explicit" -->
                                </xsd:documentation>
                        </xsd:annotation>
                </xsd:element>
                <xsd:element
                        name="deviceContext"
                        type="hs:string"
                        minOccurs="0"
                        maxOccurs="unbounded"
                >
                        <xsd:annotation>
                                <xsd:documentation>
                                        this element describes the device
                                        status a device is capable to send
                                        back to a component. The possible
                                        statuses are in use or not, in motion or
                                        not, application status on the device,
                                        last time the device was used.
                                </xsd:documentation>
                        </xsd:annotation>
                </xsd:element>
                <xsd:element
                        name="localRelay"
                        type="xsd:boolean"
                        minOccurs="0"
                        maxOccurs="1"
                >
                        <xsd:annotation>
                                <xsd:documentation>
                                        can the device sends back the list of
                                        rich applications it could relay the
                                        notification to
                                         <!-- I think the list of rich UI
                                        applications should be sent in the
                                        back channel communication instead
                                        of be listed here
                                        -->
                                </xsd:documentation>
                        </xsd:annotation>
                </xsd:element>
        </xsd:sequence>
</xsd:complexType>
<!-- Routing and alerting hints -->
        <routingConditions>
                <!--
                        May alternatively use a single device, device set, etc. Any
                        condition uses a pointer to myDevices
                -->
```

TABLE 1B-continued

```
<if select="...">
            <deviceId/>0..1 </deviceId>
    <deviceCat> [concept of a sequence, points to a
                category of devices.]
            </deviceCat>
    </if>
    <else select="..."/>
</routingConditions>
<deliveryTiming bestEfforts="true|false">
        <deliverBy time="...">
        <onFail action="..."/>
        </deliverBy>
        <!--
                Don't do anything until ... hold this until ... Unless X happens
                ... or
                Do as soon as possible, but hold it until a maximum of time t
                Bounded deferral t
                        Conditions t:
                        Conditions flow <t: { }
                        Value: { }
        .
        .
                Condition n
                        Value: { }
    </deliveryTiming>
<informationVolatility>
    <timeToLive deleteAfter="..."
        deviceId="*|deviceId"
        delete="true|false"
        log="true|false"
        retransmit="true|false"
    />0..unbounded
    <!--
    Alternatives may include:
                Replace: replace uuid, class or thread Id, etc. received most
                recently. Replace all: deliver, and delete all of same uuid,
                class or thread Id etc. received earlier Thread Id: append to
                prior class, title, ID Update attribute X in prior title, ID and
                delete Default to delete upon review Default to journal upon
                review Other info volatility policies
    -->
```

Returning to FIG. 5, in general, the information agent service 504 receives the notifications from the information sources $502_1$-$502_n$, along with information from other sources that tell the information agent service whether, and if so, how and when to route a notification to a user's device or devices $508_1$-$508_n$. When a notification is sent to a device (e.g., $508_2$), the notification information may be configured according to a device schema 510, which as described above, includes data that describes the device. For example, a notification sent to a personal computer over a broadband internet connection may include a large amount of data, such as an email message with attachments, while the same notification sent to a cellular phone may be limited in its content to only the first few lines of text of the message. Thus, in keeping with one aspect of the invention, the notification message received at a device may be tailored to that device.

In general, a device schema describes metadata that represents information about one or more devices (e.g., user devices) that are enlisted or provisioned by a service. The device schema represents the data directed to various device properties, including information used by the information agent service 504 about the connection, the rendering abilities, and interactive abilities of devices $508_1$-$508_n$. An example outline of how a device schema may be arranged, along with the information that may be represented thereby, is represented in TABLES 2A, 2B and 3 below:

TABLE 2A

Device Schema

Device Name, device type, uuid
Connection information
Bandwidth
    To/from device
  Media rendering abilities
    uri
    Text, graphics (x, y), audio, etc.
Local notification manager properties
    Local policy configuration
    Path to local policy information
Alerting modalities
    Basic alerting
        Visual cues: type
        Tone type x, vol. y
        Silent
        Rich client with alerting api/UI
        Alternate notification rendering UI
Journal ability
    Memory capacity
User interaction support
    Device genre
        Small screen with functions { }
        Rich client
            Usage preferences
                Typical viewing distance
                Typical input methodology
        User input capabilities
            Special inputs
            Text input- full keyboard, alternate
            Cursor control
            Speech

```
        Audio
        Videocapture
  Client UI components
        Local UI code and interfaces
              e.g., Windows client modules, API
Backchannel and relay
        External messaging backchannel
              Backchannel properties
              Events, class
        Confirmation abilities
              Local receipt
                    User confirmation
        Device context status
              e.g., In use, in motion, app status, activity status, last use
        Local relay for platform services
              APIs to local client services
                    Classes
```

TABLE 2B

Alternative Device Schema Outline

```
<!-- Device schema -->[may be inherited to myNotifications schema]
  <device id="...">
    <name xml:lang="..." dir="...">1..1</name>
    <type>1..1</type>
    <connectionInformation>
      <!-- -->
    </connectionInformation>
    <bandwidth to="..."from="..."/>
      <uri/>
    <text type="plain|html"/>
    <graphics x="..." y="..." colors="..."/>
    <audio/>
    <messageLimit
      size="..."
      onExceed="chunk|truncate|compress"
    />
    <!-- Local notification manager properties
      Local policy configuration
      Path to local policy configuration
    -->
    <alert
      type="???"
      tone="true|false"
      volume="..."
      alternateRenderingUi="???">0..unbounded
    </alert>
    <journal memory="...">0..1</journal>
    <userInteraction>
      <!-- shared schema from above -->
      <bandwidth to="..." from="..."/>
      <uri/><!-- what is this? -->
      <text type="plain|html"/>
      <graphics x="..." y="..." colors="..."/>
      <audio/>
      <userInput
        keyboard="none|full|alternate"
        cursorControl="..."
        speech="none|[name or uri of speech engine"
        audio="..."
        video="..."
      />
      <clientUi path="..."></clientUi>
      {any}
    </userInteraction>
```

TABLE 3

XML-formatted simple Device Schema

```
<myDevices>
  <device name=" " uuid=" ">
    <extension type=" " uuid=" "></extension>
    <friendly name/>
    <physicalAttributes>
      <deviceType/>
```

TABLE 3-continued

XML-formatted simple Device Schema

```
      <cpuFamily name = " "/>
      <operatingSystem>
        <osName/>
        <osVersion/>
        <osLanguage/>
      </operatingSystem>
      <inputMethods/>
      <renderingMethods>
        <textOnly/>
        <graphicsHeight/>
        <graphicsWidth/>
        <graphicsColorDepth />
        <audio/>
        <alertingModes/>
      </renderingMethods>
      <network>
        <transport name =" " address=" " active =" ">
          <downstreamBandwidth/>
          <upstreamBandwidth/>
        </transport>
      </network>
    </physicalAttributes>
    <informationAttributes>
      <preferredViewingDistance/>
      <preferredInputMethod/>
      <preferredAlertMode/>
      <userLanguage/>
    </informationAttributes>
  </device>
</myDevices >
```

As can be seen, a Devices schema enables the information agent service to modify the notification message for the device based on various criteria, including its type, CPU, operating system, audio and video capabilities, rendering methods, network transport capabilities and so forth.

In accordance with one aspect of the present invention, in addition to notifications received from the information sources $502_1$-$502_m$ and the device information, the information agent service 504 receives information from other sources, and based on that information, decides whether to forward a notification to a user, and if so, how (e.g., to which device) and when to do so. For example, even though a user may want to be notified about a five percent or greater stock price swing, the user may not want such a notification to be sent to the user's cellular phone when the user is in an important meeting, although at the same time the user may want the cellular phone active to receive calls from meeting participants. In general, the information agent service 504 queries other services for the data needed to make the decision, although other means of accessing the data (e.g., via a cache, or via regular updates sent from the services is also feasible).

One such set of other information comprises user notification preferences 514, which are received as data formatted (regularized) according to an information preferences schema 516. For example, a user's default routing information and explicit settings via rules, assignments, or learned preferences is stored here. To this end, the information preferences schema 516 contains settings on subscriptions and associated preferences and tradeoffs, including preferences and tradeoffs about value composition from multiple attributes, value normalization, routing, and overall handling. An example of how an information preferences schema may be arranged and the information that may be represented thereby is represented in TABLE 4A below, along with additional example preference related information in TABLE 4B:

TABLE 4A

Information Preferences Schema Outline

Subscription $S_1..S_n$
    Connection details
    Subscription history
    Remote policy path
    Administrative path
Global throttle
    Top n
    Max messages / time
        Max messages type x / time
        Max messages / device
    Preferred chunking
    Conditional throttle
        Condition 1
            Throttle policy
        Condition 2
            Throttle policy
        .
        Condition n
            Throttle policy
Value normalization, $S_1..S_n$
    Normalization type, parameter
    Dependent: value:= f(source value)
    Independent: value:= x
        Value composition (type)
            Attributes
            Value(Attributes)
    Conditional value
        Condition 1
            Value: { }
        Condition 2
            Value: { }
        .
        .
        Condition n
            Value: { }
Info Volatility preferences
Privacy and revelation
    Authorizations for proxies, people, groups
Routing preferences
    Conditional routing
        Condition 1
            Routing policy
        Condition 2
            Routing policy
        .
        Condition n
            Routing policy
Alerting modalities
    Alerting (Value, Device, Context)
        Rich client: UI preferences (Value, app, activity context)
    Conditional alerting
        Condition 1
            Alerting policy
        Condition 2
            Alerting policy
        .
        Condition n
            Alerting policy
Reliability and confirmation
    Actions on failure type x
        Journal on condition
        Re-route on condition
    Confirmation policy
Rendering preferences
    Summarization enabled
        Fidelity quality tradeoffs
            Loss of value with
                Summarization x (e.g., truncation of text, dropping audio
                channel, dropping graphics, etc.)

TABLE 4B

Information Preferences Schema Outline

```
<!-- Preference schema -->
[may be separately stored]
    <policySection>
        <!-- a section for policy like "when failure occurs, send
        to X else send to Y. Needs an ID so can be referred
        to from other sources.
        -->
    <subscription>0..unbounded
        <connection/>
        <!-- may track this by standardmethods
        -->
        <policy uri="..."/>
        <admin uri="..."/>
    </subscription>
    <messageLimits
        type="*|type|device"
        max="..."
        timeUnit="day|workWeek|week|month|year"
        timeValue="...">0...unbounded
        <cat ref="..."> <!-- can be used to store whether this is a limit for
                    message type or message device
        -->
        </cat>
    </messageLimits>
    <throttle>
        <if select="...">
            <policy/>
        </if>
        .
        .
    </throttle>
    <valueNormalization>
        <if select="..."/>
            <action amount="..."
                measurement="scalar|percent"/>
        </if>
        <!-- how strongly a user cares about whether or not someone
            has asked for a confirmation.
        -->
    </valueNormalization>
```

Note that a main or global preferences schema and a source preferences schema (per source) may be provided. More particularly, as represented in FIG. 5, a user may encode and store preferences $503_1$-$503_n$ at the sources, and also encode the main/global preferences 514. The global preferences schema and source preferences schema may be the same, but their usage is different.

In general, source preferences $503_1$-$503_n$ may be set up and stored locally at each source $502_1$-$502_n$. The source preferences $503_1$-$503_n$ are used to control emissions of notifications, rather than having coarse emission policies that provide a flood of emitted notifications, as such a flood of emissions would then require a significant amount of central filtering. The user's source preferences may be set up at a main preference site, or when users make an initial subscription at a source site, (e.g., at a travel site, an auction site, and so forth). In this manner, information sources will have consistent user interfaces and guidelines to provide users with a place to set up a subscription and to encode preferences about the emission of messages from the third-party sites, as well as how the sites will stamp attributes in notification schema by the third-party sites.

The source preferences may work in conjunction with the global preferences to provide notifications in accordance with the user's requirements. For example, after an initial set up of a subscription, an information source may stamp properties such as urgency values in the notification schema that annotates the notification. However, a user can also store in the global/main (cross-source) notification preferences 514 information about how to modify such attributes, based on a full rewrite, or a re-weighting (e.g., for scalar values of urgency) of fields. Thus, a notification stamped highly urgent at the source via the encoded preferences stored at the source, may be modified to normal urgency, for example, on weekends.

Figure 6:
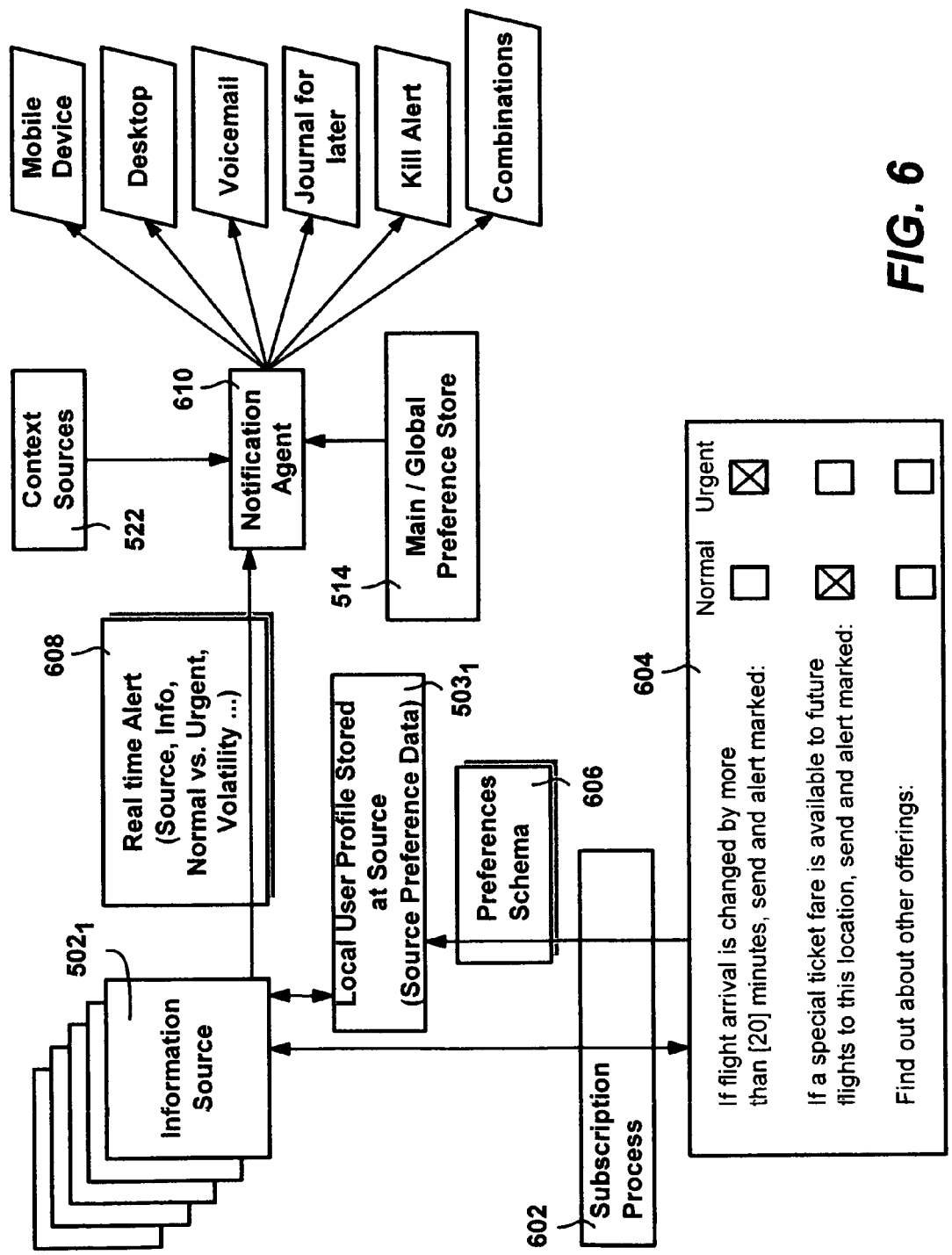
FIG. 6 is a block diagram generally representing a subscription process in a notification platform for providing user preference data to information sources, in accordance with one aspect of the present invention.

FIG. 6 represents an example way of setting and using such source preferences $503_1$ at an information source $502_1$. For example, the user interface may appear when the user is otherwise scheduling and purchasing flights, notices that the information service is a participating member in the .Net Notification service, and clicks on an appropriate button.

In general, a subscription process 602 such as a script or other executable code provides a user with an appropriate user interface 604. In the example of FIG. 6, the information source deals with flight information and provides a user interface form or the like comprising one or more flight-related or other appropriate selections. In this simple example, the user can request a particular urgency value set up with notifications, or no notifications at all. The preferences about some conditions for firing notifications from the source may be stored in the source preferences store $503_1$, encoded with a source preferences schema format 606, which may be the same as other preference schemas.

Sometime later, when the information source fires the notification (e.g., a real time alert) 608, a notification agent 610 of the information agent service 504 for the user will determine how to handle the notification based on the context sources 522 and global preference data 514, as described above. For example, as represented in FIG. 6, the notification may be routed to the user's mobile device, desktop or voicemail service. The notification may also be journalled for later delivery, killed, or some combination of these other (non-killed) options.

In one implementation, to make the source preference store accessible for initial set up and/or later modification, (regardless of whether access is performed locally or by HTML content or the like sent from a remote source), pointers (paths) are stored in the main/global notification preference store 514. The main preference store 514 thus provides a single, unified location for users to control the user's distributed preference information, preferences on emission, establish initial value stamping, make changes in subscriptions and notification policies, change, turn on, turn off, and modify multiple sources, change devices provisioned, and so forth. Both the source and main stores may be arranged to abide by the same notification preference schema, or a custom-tailored source schema (e.g., one that is lighter weight) may be employed. In this manner, the user is in control via the main notification preferences. Note that via this single point of control, an automated agent mechanism may take the user's main notification preferences and distribute appropriate data to the sources to more optimally control emissions. For example, if a user wants every notification killed on weekends except telephone calls, but only sets this up in the main preference store 514, an automated agent can examine the main preference store 514, and realize that it is more efficient to tell each non-telephone information source to not emit the notification at all on weekends, rather than having the emissions fired but simply killed at the notification agent 610. The automated agent may thus make the appropriate settings on each information source on the user's behalf.

As can be appreciated, the usage of a defined notification schema to annotate notifications into a set of regularized properties, along with the above-described source and global preferences model, allows a conceptual normalizing of the handling (e.g., routing, deliberation, alerting, rendering) of notifications. For example, via the schemas, notifications may be normalized such that a voicemail message from a friend and an auction website's announcement may be each considered via the same information agent machinery. This is because semantically it is known what the attributes and properties represented in the schema are, such that these attributes and properties are processed and/or stamped via procedures that consider information from a user's preferences and/or automated assignments. Thus, automation, plus the user's tuning of a preference via a user interface, equalizes or normalizes the handling of data in accordance with a user's desired settings. By way of example, the value property in the notification schema for a voicemail message may be initially stamped automatically in a manner that gives it a higher urgency value than a user would prefer, while the value property automatically assigned by the auction website may be too low of an urgency value for the user's preference. Because the urgency information is maintained in both the source and the main preferences, a user's secondary processing may re-weight or normalize the urgencies, e.g., by increasing the urgency of the auction house's notification while decreasing the urgency of the voicemail message. In sum, the system provides the regularized annotation of notification data into a set of defined properties that can be acted on, re-weighted and/or rewritten by other procedures under the control of the user. In this manner, an external process may set initial or coarse values for the properties stamped in accordance with a notification schema, with those properties later modified (e.g., re-scaled) based on a user's preferences and the nature of the information.

Returning to FIG. 5, the information agent service 504 also obtains current user context data, including state data 520, to make its decision on whether, and if so how and when, to issue a notification to which device. Such user state data, provided by various context sources 522, collectively, is accessed by the information agent service 504 from a context service 524, via a context schema 526. The context schema 526 comprises a standard form for representing, storing, updating, and accessing information about a user's current situation, including schedule, presence, location, and time-centric profiles or other time-sensitive situation information. As will be understood, the context schema 526 may contain parts of one or more of the various schemas 531-537 (as well as others) that comprise the context sources 522.

The context sources 522 comprise presence data represented according to a presence schema 531, location data represented according to a location schema 532, schedule data represented according to a schedule schema 533, and people and groups data represented according to a people and groups schema 534. The context sources 522 also comprise client context data represented according to a client context data schema 535, extended context data represented according to an extended-context data schema 536, and user state (e.g., sensor) schema 537. The context sources may also comprise other data available through other sources and suitable schemas, although this may be accomplished via an extended-context schema.

In general, the presence schema 531 refers to a standardized data form that contains attributes about the presence of a user at or near a particular device. For example, when establishing presence, it is useful to include notions of physical presence based on interactions with a device (keyboard, mouse, and so on), and sense proximal activities such as via proximity and motion detectors. In addition to detection, explicit statements by a user about the user's presence are included, as well as rules that define what details others can view about a user's presence, which may be dependent on the identity of each other viewer. Beyond current state, presence information can include information on temporal proximity for activity. The following table, TABLE 5, provides an example of how a presence schema may be arranged, and the information that may be represented thereby:

TABLE 5

Presence Schema Outline

Explicit setting of shared presence state
Activity now at devices $x_1..x_n$
    Device availability
    User interactions {x} with device <t
    Ambient acoustics / conversation
    Motion sensing
Time of sensed last activity at device x
Availability forecast
    Time until resource x
    e.g., Time until current meeting ends
        Time will have a 1 hr block open on calendar
        Time until full screen available
        Time until videoconference availability Presence information including an XML formatted .NET Presence schema is also described in the aforementioned U.S. patent application Ser. No. 10/017,680.

The location schema 532 refers to a regularized form for storing data about a user's (or device's) location for encoding and sharing location information among components. For example, location information can include detailed global positioning system (GPS) coordinates, notions of a nearest cellular telephone station, or data abstracted to represent types of general locations tagged to represent key spatial semantics of an environment, such as the following abstraction of location: in main office, out of office—on-site local, out of office—offsite, at home, in car, traveling-out of town, and so on. Further, the location schema allows for prediction, e.g., where a user is going to be located at some time in the future based on a current location plus speed and direction. For example, such prediction information may be used to notify a user traveling in a car that at a fast food restaurant at the next exit ramp is offering a special deal. An example of how a location schema may be arranged and the information that may be represented thereby is represented in TABLE 6 below:

TABLE 6

Location Schema Outline

Location-labeled machines
    Local position; enterprise abstractions
    High precision info: GPS, last gps, active cell station Location information is also described in the aforementioned U.S. patent application Ser. No. 10/017,680, which provides an XML formatted .NET Location schema as in TABLE 7, below:

TABLE 7

Location Schema (XML)

<m:myLocation changeNumber="..." instanceId="..."
  xmlns:m="http://schemas.microsoft.com/hs/2001/10/myLocation"
  xmlns:hs="http://schemas.microsoft.com/hs/2001/10/core">$_{1..1}$
  <m:location changeNumber="..." id="..." creator="...">$_{0..unbounded}$
    <m:cat ref="...">$_{0..unbounded}$</m:cat>
    <m:address>$_{1..1}$
      <hs:cat ref="...">$_{0..unbounded}$</hs:cat>

TABLE 7-continued

Location Schema (XML)

<hs:officialAddressLine xml:lang="..."
      dir="...">$_{0..1}$</hs:officialAddressLine>
      <hs:internalAddressLine xml:lang="..."
      dir="...">$_{0..1}$</hs:internalAddressLine>
      <hs:primaryCity xml:lang="..." dir="...">$_{0..1}$</hs:primaryCity>
      <hs:secondaryCity xml:lang="..."
      dir="...">$_{0..1}$</hs:secondaryCity>
      <hs:subdivision xml:lang="..." dir="...">$_{0..1}$</hs:subdivision>
      <hs:postalCode>$_{0..1}$</hs:postalCode>
      <hs:countryCode>$_{0..1}$</hs:countryCode>
      <hs:latitude>$_{0..1}$</hs:latitude>
      <hs:longitude>$_{0..1}$</hs:longitude>
      <hs:elevation>$_{0..1}$</hs:elevation>
      <hs:velocity>$_{0..1}$
        <hs:speed>$_{0..1}$</hs:speed>
        <hs:direction>$_{0..1}$</hs:direction>
      </hs:velocity>
      <hs:confidence>$_{0..1}$</hs:confidence>
      <hs:precision>$_{0..1}$</hs:precision>
      {any}
    </m:address>
    <m:reportingDevice>$_{1..1}$</m:reportingDevice>
    <m:lastUpdateTime>$_{1..1}$</m:lastUpdateTime>
    <m:expiresAt>$_{0..1}$</m:expiresAt>
    {any}
  </m:location>
  <m:subscription changeNumber="..."
  id="..." creator="...">$_{0..unbounded}$
    <hs:trigger select="..." mode="..."
    baseChangeNumber="...">$_{1..1}$</hs:trigger>
    <hs:expiresAt>$_{0..1}$</hs:expiresAt>
    <hs:context uri="...">$_{1..1}$ {any}</hs:context>
    <hs:to>$_{1..1}$</hs:to>
  </m:subscription>
  {any}
</m:myLocation>

The meaning of the attributes and elements shown in TABLE 7 are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myLocation (minOccurs=1 maxOccurs=1) element encapsulates the content document for the .NET Location service. The /myLocation/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myLocation/@instanceId (string minOccurs=0 maxOccurs=1) attribute is a unique identifier typically assigned to the root element of a service. It is a read-only element and assigned by the .NET My Services system when a user is provisioned for a particular service.

The /myLocation/location (minOccurs=0 maxOccurs=unbounded) node has a /myLocation/location/@changeNumber (minOccurs=0 maxOccurs=1) changeNumber attribute, designed to facilitate caching of the element and its descendants. This attribute is assigned to this element by the .NET My Services system. The attribute is read-only to applications. Attempts to write this attribute are silently ignored.

The /myLocation/location/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myLocation/location/@creator (string minOccurs=0 maxOccurs=1) attribute identifies the creator in terms of useRId, appId, and platformId of the node.

The /myLocation/location/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myLocation/location/cat/@ref (anyURI minOccurs=0 max Occurs=1) attribute references a category definition (<catDef/>) element using the rules outlined in the myCategories section, described above.

The /myLocation/address/officialAddressLine (string minOccurs=0 maxOccurs=1) element contains the most precise, official line for the address relative to the postal agency servicing the area specified by the city(s)/postalCode. When parsing an address for official postal usage, this element contains the official, parsable address line that the regional postal system cares about. Typical usage of this element would be to enclose a street address, post office box address, private bag, or any other similar official address. Internal routing information like department name, suite number within a building, internal mailstop number, or similar properties should be placed within the internalAddressLine element. The /myLocation/address/officialAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/officialAddressLine/@dir (string minOccurs=0 maxOccurs=1) optional attribute specifies the default layout direction for the localized string. Valid values are rtl (right to left), and ltr (left to right).

The /myLocation/address/internalAddressLine (string minOccurs=0 maxOccurs=1) element contains internal routing information relative to the address specified by the officialAddressLine. Items like department name, suite number within a building, internal mailstop number, or similar properties should be placed within this element. The /myLocation/address/internalAddressLine/@xml: lang (minOccurs=1 maxOccurs=1) required attribute is used to specify an ISO 639 language code or an ISO 3166 country code as described in RFC 1766. The value of this attribute indicates the language type of the content within this element. The /myLocation/address/internalAddressLine/@dir (string minOccurs=0 maxOccurs=1) optional attribute specifies the default layout direction for the localized string. Valid values are rtl (right to left), and ltr (left to right).

The /myLocation/address/primaryCity (string minOccurs=0 maxOccurs=1) element defines the primary city for this address. The /myLocation/address/primaryCity/@xml: lang (minOccurs=1 maxOccurs=1) required attribute is used to specify an ISO 639 language code or an ISO 3166 country code as described in RFC 1766. The value of this attribute indicates the language type of the content within this element. The /myLocation/address/primaryCity/@dir (string minOccurs=0 maxOccurs=1) optional attribute specifies the default layout direction for the localized string. Valid values are rtl (right to left), and ltr (left to right).

The /myLocation/address/secondaryCity (string minOccurs=0 maxOccurs=1) optional element defines the secondary city for this address. Example types for this element include city district, city wards, postal towns, and so on. The /myLocation/address/secondaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/secondaryCity/@dir (string minOccurs=0 maxOccurs=1) optional attribute specifies the default layout direction for the localized string. Valid values are rtl (right to left), and ltr (left to right).

The /myLocation/address/subdivision (string minOccurs=0 maxOccurs=1) element contains the official subdivision name within the country or region for this address. In the United States, this element would contain the two letter abbreviation for the name of the state. This element is also commonly treated as the "first order admin subdivision" and will typically contain subdivision names referring to administrative division, Bundesstaat, canton, federal district, province, region, state or territory. The /myLocation/address/subdivision/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/subdivision/@dir (string minOccurs=0 maxOccurs=1) optional attribute specifies the default layout direction for the localized string. Valid values are rtl (right to left), and ltr (left to right).

The /myLocation/address/postalCode (string minOccurs=0 maxOccurs=1) element contains the official postal code for this address. The /myLocation/address/countryCode (string minOccurs=0 maxOccurs=1) element contains the 2 letter ISO-3166 id of the country, dependency, or functionally equivalent region for this address. The /myLocation/address/latitude (string minOccurs=0 maxOccurs=1) element specifies the latitude value for this address in units of decimal degrees. Geodetic datum WGS84 is required. The /myLocation/address/longitude (string minOccurs=0 maxOccurs=1) element specifies the longitude value for this address in units of decimal degrees. Geodetic datum WGS84 is required. The /myLocation/address/elevation (string minOccurs=0 maxOccurs=1) element specifies the elevation above sea level with respect to WGS84 geodetic datum. The units for this value is meters.

The /myLocation/address/velocity (minOccurs=0 maxOccurs=1) element specifies the last reported velocity associated with this address. Of course, for fixed addresses the velocity node would either not be present, or speed would be zero indication stationary position. The /myLocation/address/velocity/speed (string minOccurs=0 maxOccurs=1) element specifies the last known speed associated with this report in units of meters per second. The /myLocation/address/velocity/direction (string minOccurs=0 maxOccurs=1) element specifies the last known direction associated with this report in units of degrees decimal. The /myLocation/address/confidence (string minOccurs=0 maxOccurs=1) element specifies a percentage value that indicates the confidence value that this location is accurate within the specified precision. The /myLocation/address/precision (string minOccurs=0 maxOccurs=1) element specifies the precision in meters of this location. The value defines a spherical zone that the location falls within.

The /myLocation/location/address/{any} (minOccurs=0 maxOccurs=unbounded) allows for address-related extensibility.

The /myLocation/location/reportingDevice (anyURI minOccurs=1 maxOccurs=1) element contains the device name of the device supplying this location information. The name is encoded as a URI. One common format for this name is a uuid: scheme uri interpreted as a "Universal Device Number" as exposed by a Universal Plug and Play infrastructure.

The /myLocation/location/lastUpdateTime (dateTime minOccurs=1 maxOccurs=1) element specifies the last update time of this location report. The /myLocation/location/expiresAt (dateTime minOccurs=0 maxOccurs=1) optional element specifies the time after which this location report is considered expires. The system is free to delete expired elements on its own schedule.

The /myLocation/location/{any} (minOccurs=0 maxOccurs=unbounded) field allows for location-related extensibility.

The /myLocation/subscription (minOccurs=0 maxOccurs=unbounded) element defines a subscription node as described above in the subscription section.

As also represented in FIG. 5, the schedule schema 533 refers to a standard representation of information about different types of appointments, and for encoding recurrent periods of time and abstractions about the location, situation, and overall informational context associated different named periods of time. For example, a user may wish to assert a period of recurrence such that 8 am-6 pm on weekdays is considered by default to be a work context, and other times to considered by default to be a home context. A schedule schema representation allows for the encoding of appointments, tagged with several key properties such as meeting type (selected from an ontology of meeting types), number of attendees, location of meeting, meeting organizer, and with an interruptability level associated with different appointments or appointment types, and/or other meeting properties. An example of how a schedule schema may be arranged and the information that may be represented thereby is represented in TABLE 8 below:

TABLE 8

Schedule Schema Outline

Recurrent contexts (e.g., work, home)
   Days, time of day, time periods
   Special extended contexts (e.g., vacation)
      Start time, end time, internal structure
   Appointments
      Title
      Type, event uid, registration
      Participants
      Start, Finish
      Location
      Preferred reminder, alerting
      Interruptability
         Scalar value, or by properties of allowed
         messages: message types, message
         ID, info value, and the like.

It should be noted that the calendar schema described in the aforementioned U.S. patent application Ser. No. 10/017,680, generally can be used for providing some or all of the same information, as the calendar schema includes representations of appointment data, recurrence, and so forth. Thus, as used herein, the term "schedule" is essentially interchangeable with "calendar," such as with respect to a user's context including schedule or calendar data being used by the information agent service 504 to make notification determinations.

The people and groups schema 534 captures information about a user's abstractions about other people, with a focus on different groupings of people and their properties. For example, the author of a message is one aspect for routing and reviewing of email, whereby people and people of group authentication are leveraged in an information service. Groups are labeled sets of people, including explicit group assembled by hand, and those that are composed implicitly by reference to relationships, co-location, or activities. Implicit groups include groups built by reference, e.g., "my direct reports," "all people down the management chain from me in my organization," and so on. Dynamic groups include groups built by watching activity and examining assets. For example, a dynamic group may include "people I am meeting with today," such that notifications from those individuals may have a higher priority than they ordinarily would, e.g., their calls will be allowed to get through instead of routed to voicemail. An example of how a people and groups schema may be arranged and the information that may be represented thereby is represented in TABLE 9 below:

TABLE 9

People and Groups Schema Outline

People (properties)
Groups (properties)
   Explicit groups (membership)
   Group by relation (membership by org. relation)
   Dynamic groups
      (membership identified dynamically by state, action, shared
      project, e.g., people who I am meeting with today-per schedule)

A client computing context schema 535 captures registered contextual events that characterize a user's activities, interactions with a computer's operating system, and software applications being used. For example, the state of an application, such as when the application is maximized to full screen on a display, is a useful state to consider in the client notification policy, and in policy preferences. In general, users may be provided with a means for linking software usage and modalities to contexts, and thus make notification policies sensitive to different computing contexts. In one approach, users may select from a list of software applications and key contextual modes of the applications, and then to link the special modes of the software applications to different policies regarding the handling of notifications. To extend this example, a user may wish to encode preferences used by a local device notification manager or a more global information agent that notifications that have less than the user-defined level of urgency should never interrupt an Microsoft® Powerpoint® presentation when Powerpoint® is sensed to be in presentation mode—and that the notification should either be deferred for some time that is some inverse function of its urgency, or journalled for later. Additional applications and modes, as well as other potentially sensed computer activities, may be added to groups of applications, where each group represents a different kind of interruptability, each associated with different policies for handling notifications. In general, one or more such specialized schemas may be provided for encoding information about context that is registered and tracked on a client machine. An example of how one such client computer context schema may be arranged and some of the information that may be represented thereby is represented in TABLE 10 below:

TABLE 10

Client Computer Context Schema Outline

Sensed state type class, state values, stateID
    e.g., Application (e.g., PptXP2.1, Presentmode, winapoffpt.4182)
        System
Composed event (e.g., temporal pattern user events)

The extended-context schema 536 captures information about the nature, states, and semantics associated with new sources of contextual information that a user wishes to integrate into an information service. For example, a user may wish to add a conversation detector via a standard interface. Other examples include adding situations, sensors, and sensed states, and passing through a conditioning statement to the preferences schema and/or notification schema. An example of how an extended-context schema may be arranged and the information that may be represented thereby is represented in TABLE 11 below:

TABLE 11

Extended Context Schema Outline

Sensed state type class, state values, stateID
  e.g.,
    Schedule
    Perceptual (Acoustic, Vision, Motion, Proximity)
    Integration
      Interface type
      Connection One or more other user state sensor schemas 537 may be provided to supply additional user state information. As can be appreciated, numerous other schemas and/or ways of providing regularized context information to the information agent service 504 are easily integrated into the notification platform 500.

Thus, in accordance with the present invention, the information sources, following any of their own filtering operations, provide notifications via a regularized notification schema 506, (e.g., formatted as an XML document fragment) to the information agent service 504. The information agent service 504 determines whether to forward the notification to a user device $508_1$-$508_n$ (or devices), based on criteria including user preference information and the current context of the user. Again, this information is preferably sent to the information agent service 504 via document fragments or the like regularized according to preference and context schemas, 516 and 524, respectively. The information agent service 504 can store the information in a journal 540 for later delivery, and/or communicate the information to a user device, preferably in a messaged formatted in accordance with a regularized device schema 510.

The information agent service 504 thus determines whether to output a notification as a function of context and content, along with user preferences and/or other notification policies. By determining a user's context as needed, the information agent service 504 can handle a user's changing context. Further, the information agent service 504 is able to express value based on conditional context, and work with simple Boolean expressions such as AND/OR/NOT, e.g.:

myCalendar:/myCalendar/today[@time] = 'Important meeting'
myLocation:/electronic/endpoint[@name="Messenger"]/lastUpdate[@

-continued value > 30 min < 90 min].

The information agent service 504 may operate by simple rule-based policies, and/or by numerical analysis, such as a cost-benefit-based analysis, where numerical representations of the value of reviewing information and the cost of disruption are considered based on content and context. Such cost-benefit analyses include the use of decision-analytic methods for making communication or notification decisions under uncertainty in context and content based on observations.

As an example of a simple rule-based policy, a simple rule such as, "if a user is not at his desk during work hours, send the notification to the user's pager" may be used. A more complex policy system may be based on numerical values such as a numerical representation of the cost of delayed review of an item and the cost of disruption in different situations by different kinds of alerting modalities. For example, a highly urgent message may have a cost of delayed review that exceeds the cost of disruption that the user has set for the current context, or the user has had computed therefor (e.g., based on context and/or preference data), below which the user does not want to be interrupted. In other words, the information agent can essentially determine whether the cost of delayed review is greater than the cost of disruption associated with getting the alert in different ways, and if this is the case select the method and device (or multiple devices) with the greatest net value. For example, a user may set a value on a cellular telephone so that the cellular telephone will not ring unless a notification was at a level of urgency (e.g., associated with a cost of delayed review) assigned to emergency communications, or the user's boss is calling. The value can change over time or due to other factors, e.g., the level may drop after some length of time to let other calls get through, as determined by a specified function, as described above. In more sophisticated analyses, the uncertainties in the current context, in the nature of the content, and in such variables as the reliability that a user will receive different kinds of alerts, and the times a user will see a message—both with and without—the notification, can be considered with decision analysis in a smart information decision making system, that selects actions in accordance with the maximization of the expected value of the notification action. As an example, a system may assign urgency measures to incoming voicemail based on an automated prosady analysis of the voicemail messages, potentially coupled with word- and phrase-spotting analyses based on speech-to-text processing. Such an analysis may be used to rank-order voicemail as well as to guide decision making about the transmission of alerts about the voicemail and the transmission and caching of the voicemail itself on portable digital devices. The automated assignment of urgency to the voicemail content can be uncertain, based on the reliability of a classifier. Thus, an information agent might consider the probability distribution over the urgency and compose such notions as the expected value of the urgency of voicemail in considering whether to alert the user and/or download the content of the voicemail to a user's device. There may also be uncertainty about the context of the user, e.g., whether or not the user is engaged in a regular meeting or is giving a presentation, given ambiguity in the current calendar entry, and on observations about a user's location and acoustical context. Such uncertainties can be considered in a decision analysis that selects alerting and routing in a manner than maximizes a measure or estimation of net expected value to the user, based on preferences and observations.

Figure 7:
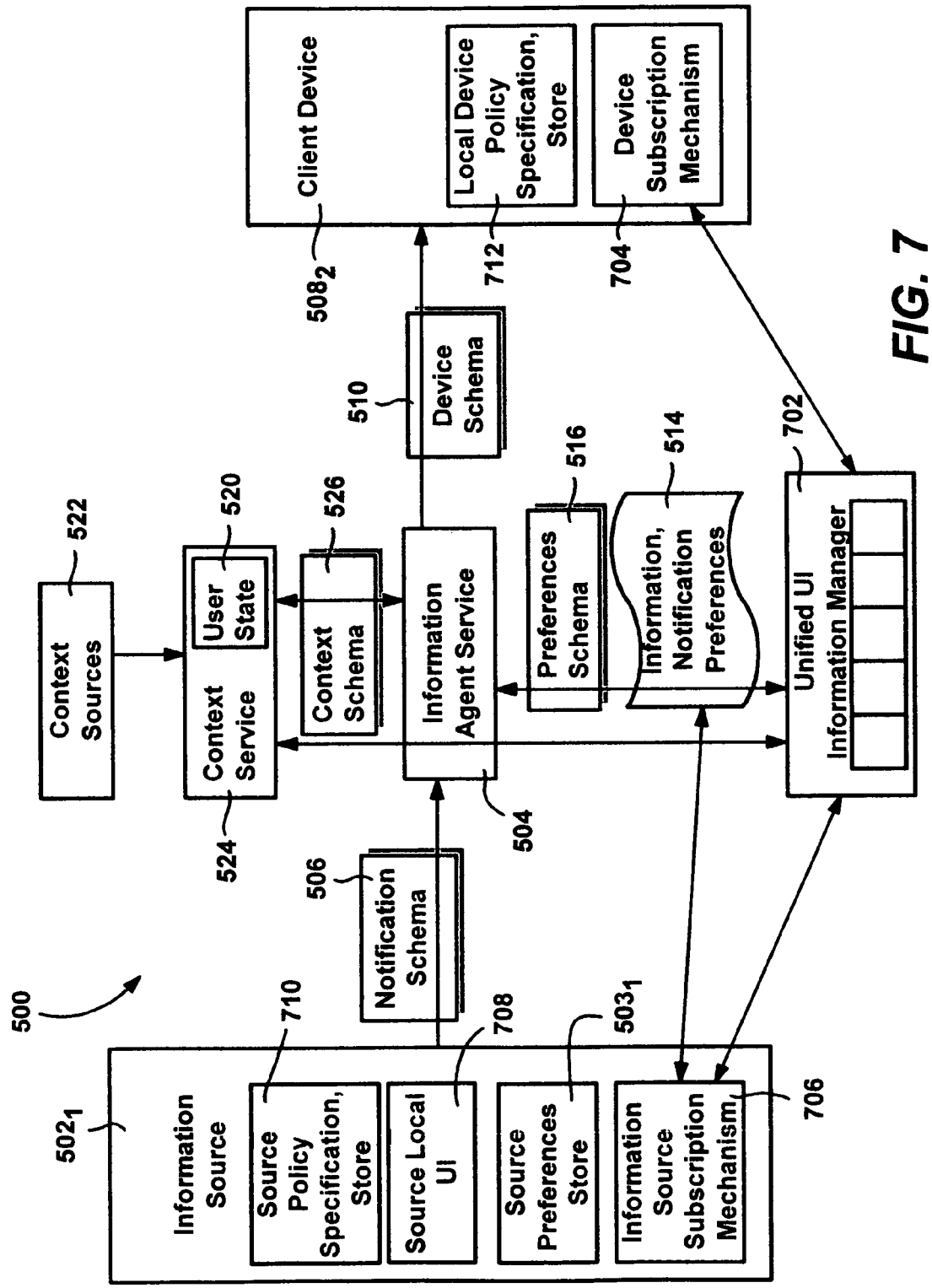
FIG. 7 is a block diagram generally representing the notification platform of FIG. 5, showing components in a selected information source and client device to provide criteria-controlled notifications in accordance with one aspect of the present invention.

Turning to FIG. 7, there is shown the notification platform 500 with additional details of one of the information sources (e.g., $502_1$) and of one of the client/user devices (e.g., $508_2$). As represented in FIG. 7, a client subscribes to an information service, which may be virtually any provider of information, e.g., a third party financial institution. To this end, a unified user interface information manager 702 enables the client device $508_2$ to subscribe to the information source, via a client device subscription mechanism 704 and information source subscription mechanism 706. Note that a subscription is preferably user (identity) based, not device based, such that client is not limited to receiving notifications only on the device that is presently using the unified user interface information manager 702. For example, a user may use a client personal computer to subscribe for notifications, which may be received by the client's cellular telephone client device.

As also mentioned above, the information source may do some of its own pre-filtering operations. To this end, the user preferences 514 may have a link to the information source's subscription mechanism 706, via which the user may edit the user's preference store $503_1$ (and other preference stores on other information sources) from a single access point. Of course, other ways of providing the user with access to the user's preference store $503_1$ are feasible. The information source $502_1$ may include its own user interface (UI) code 708, for controlling its operations, along with internal policies 710. For example, an information source policy may be set up by an administrator or the like to not output more than one notification per minute to a user, regardless of what the user specifies.

The client device (e.g., $508_2$) may also include local device policy data 712 that may override notification decisions made by the information agent service 504 on its behalf, based on the user preferences and user context (state). For example, a user may set up a "receive text only" policy on a device when entering a theater so that regardless of what the information agent service 504 sends, the user will not be audibly disturbed.

Figure 8:
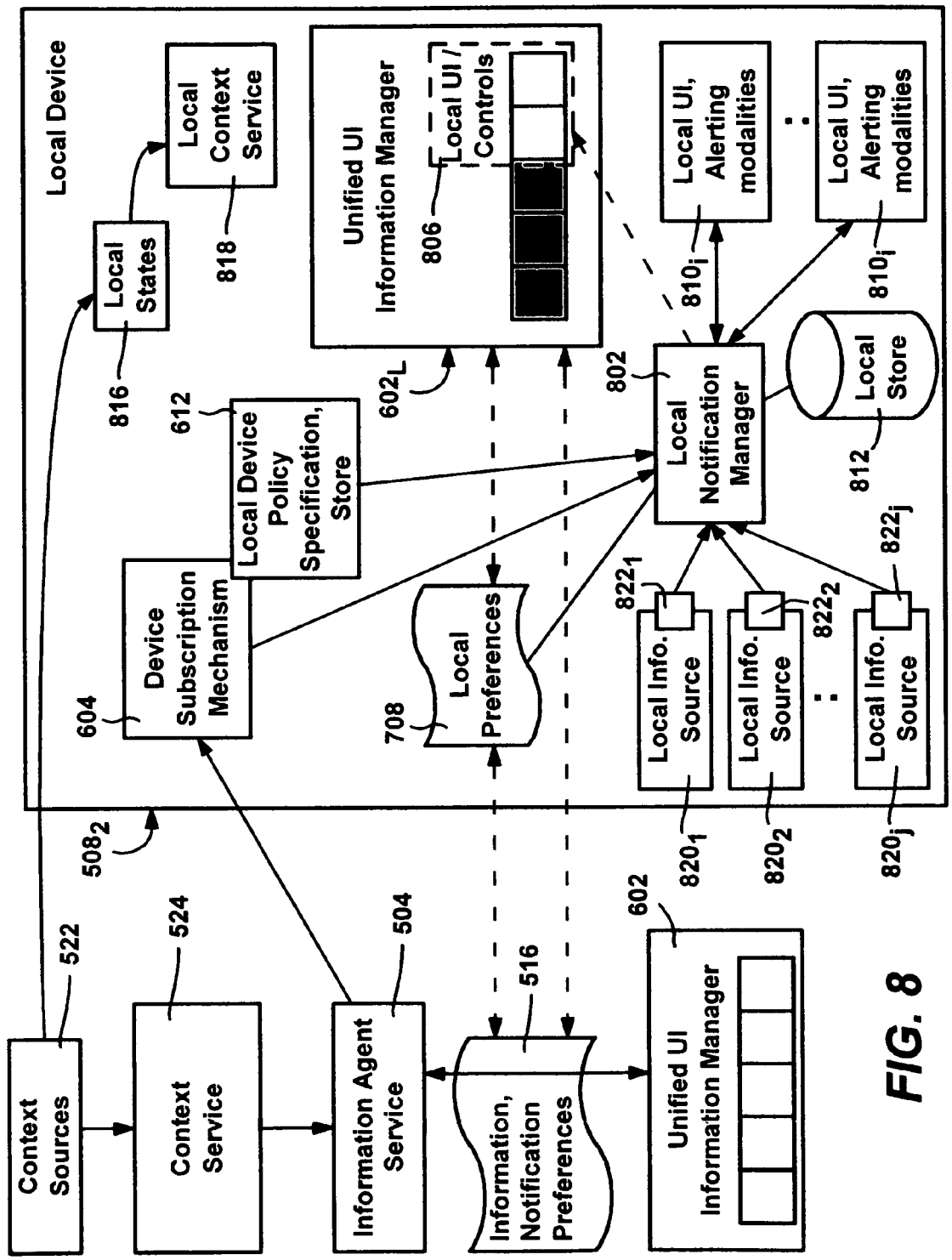
FIG. 8 is a block diagram generally representing components in the client device interacting with external components to provide criteria-controlled notifications in accordance with one aspect of the present invention.

FIG. 8 represents local components in a device (e.g., $508_2$) interacting with various external components. In general, the local device $508_2$ includes components that operate somewhat similarly to those in the notification platform. For example, in addition to the device subscription mechanism 704 and local device policy specification and store 712 described above, in one implementation the local device $508_2$ includes a local notification manager 802 that takes inputs from a number of sources in order to control the output of notifications on the local device $508_2$. Further, the local device $508_2$ has local UI controls 806 in a local instance $702_L$ of the unified UI information manager 702. Via the local UI, the local device $508_2$ may store local preferences 808 and export notification preferences 516 to the information agent service 504 (as well as to the information sources, as described above). The notification manager can use these local preferences in its determination as to whether and how to output a notification on local UI alerting modalities $810_1$-$810_i$, and/or preserve a notification in a local store 812. Context information in the form of local states 816 or the like may also be provided to the local device where it may be used by a local context service 818.

Local information sources $820_1$-$820j$, each including an information source subscription mechanism $822_1$-$822_j$, may provide local notifications that are handled in a similar manner. More particularly, the local notification manager 802 may receive local notifications or externally provided notifications, and uses local policies, local context, and/or local preferences to determine whether, and if so how and when, to output the notifications. In this manner, the device is ultimately in charge of notification output corresponding to received notifications, from the device subscription manager 704, as well as notifications from any local information sources and uses any local policies to handle outputting of the notification.

As can be seen, there is provided a notification platform that provides notifications from information sources to client devices based on a user's preferences and context, including presence information, location information, and schedule information. The information that is communicated between the various services and components is regularized by formatting the exchanged data according to schemas. The platform and schemas are extensible, and for example, allow new sensors and sensed states about a user's context to be added to a notification service.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having stored thereon a data structure, comprising:
   a notification regularized according to a notification schema, the notification including:
   a first set of data comprising notification identification information;
   a second set of data comprising notification content; and
   a third set of data comprising requirements for sending the notification to a client, the requirements including indications stored on a central server of last known good states of devices associated with the client;
   and wherein a notification service receives the notification and analyzes the third set of data against client-related criteria to determine conditions for sending the notification to the client via at least one of the devices;
   the storage medium further comprising instructions for causing at least one processor to receive the notification and analyze the third set of data against client-related criteria to determine conditions for sending the notification to the client via at least one of the devices, determine based on the third set of data whether the notification can presently meet the conditions, and if the notification can presently meet the conditions, send the notification to the client via at least one of the devices, and if the notification cannot meet the conditions but can meet the conditions later, maintain the notification until the conditions are met and then send the notification to the client via at least one of the devices.

2. The storage medium of claim 1, wherein the first set of data includes information identifying the source of the notification.

3. The storage medium of claim 2 wherein one of the types of content comprises text data.

4. The storage medium of claim 2 wherein one of the types of content comprises graphics data.

5. The storage medium of claim 2 wherein the third set of data comprises notification preferences associated with the client that specify how to modify attributes of the notification.

6. The storage medium of claim 5, wherein the notification preferences specify a reduction of an urgency level of the notification.

7. The storage medium of claim 2 wherein one of the types of content comprises audio data.

8. The storage medium of claim 2 wherein one of the types of content comprises video data.

9. The storage medium of claim 1, wherein the third set of data includes data corresponding to bandwidth requirements.

10. The storage medium of claim 1, wherein the third set of data includes data corresponding to media rendering requirements.

11. The storage medium of claim 1, wherein the third set of data includes data corresponding to user interaction requirements.

12. The storage medium of claim 1, wherein the third set of data includes data corresponding to backchannel requirements.

13. The storage medium of claim 1, wherein the third set of data includes data corresponding to at least one device-specific hint.

14. The storage medium of claim 13, wherein at least one device-specific hint corresponds to device rendering capabilities.

15. The storage medium of claim 13, wherein at least one device-specific hint corresponds to a device fidelity value.

16. The storage medium of claim 13, wherein the third set of data includes condition data that can be matched to the client-related criteria.

17. The storage medium of claim 1, further comprising a fourth set of data, the fourth set of data comprising notification volatility information.

18. A computer-readable storage medium having stored thereon a data structure, comprising:
  a notification regularized according to a notification schema, the notification including:
    a first set of data comprising notification content;
    a second set of data comprising requirements for sending the notification to a client, the requirements including indications stored in a central server of last known good states of devices associated with the client; and
  a third set of data comprising notification volatility information;
    the storage medium further comprising instructions for causing at least one processor to receive the notification and analyze the second set of data against client-related criteria to determine conditions for sending the notification to the client via at least one of the devices, determine based on the second set of data whether the notification can presently meet the conditions, and if the notification can presently meet the conditions, send the notification to the client via at least one of the devices, and if the notification cannot meet the conditions but can meet the conditions later, maintain the notification until the conditions are met and then send the notification to the client via at least one of the devices or maintain the notification until the notification volatility information expires the notification.

19. The storage medium of claim 18 wherein the notification can presently meet the conditions by modification of the notification to meet the requirements before sending.

* * * * *

UNITED STATES PATENT AND TRADEMARK OFFICE
CERTIFICATE OF CORRECTION

PATENT NO.        : 7,613,721 B2
APPLICATION NO.   : 11/203484
DATED             : November 3, 2009
INVENTOR(S)       : Eric J. Horvitz et al.

Page 1 of 1

It is certified that error appears in the above-identified patent and that said Letters Patent is hereby corrected as shown below:

In column 16, line 38, delete "Occurs=max" and insert -- Occurs=1 max --, therefor.

In column 17, line 7, delete "@" and insert -- @type --, therefor.

In column 22, line 9, delete "Occurs=max" and insert -- Occurs=1 max --, therefor.

In column 22, line 11, delete "Occurs=max" and insert -- Occurs=1 max --, therefor.

In column 27, line 65, delete "Occurs=max" and insert -- Occurs=1 max --, therefor.

Signed and Sealed this
Seventeenth Day of May, 2011

David J. Kappos
*Director of the United States Patent and Trademark Office*